United States Patent [19]
LaPadula, III et al.

[11] Patent Number: 5,535,237
[45] Date of Patent: Jul. 9, 1996

[54] METHOD AND SYSTEM FOR A MULTI CHANNEL AND SEARCH GLOBAL POSITION SYSTEM SIGNAL PROCESSOR

[75] Inventors: Leonard J. LaPadula, III; George W. Pawlowski, both of Carrollton; David W. Rekieta, Allen, all of Tex.; Hugh L. Scott, Colorado Springs, Colo.; Chyi H. Lu, Plano, Tex.; John P. Volpi, Garland, Tex.; Mitchel B. Stiles, Plano, Tex.

[73] Assignee: Texas Instruments Incorporated, Dallas, Tex.

[21] Appl. No.: 192,210

[22] Filed: Feb. 4, 1994

Related U.S. Application Data

[63] Continuation of Ser. No. 663,968, Feb. 28, 1991, abandoned.

[51] Int. Cl.$^6$ .............. H04B 1/69; H04B 1/707; G01S 5/02
[52] U.S. Cl. .............. 375/200; 375/206; 380/34; 342/352; 342/357
[58] Field of Search .............. 375/1, 200–210; 380/34; 342/352, 357; 455/314

[56] References Cited

U.S. PATENT DOCUMENTS

| | | | |
|---|---|---|---|
| 4,445,118 | 4/1984 | Taylor et al. | 342/357 |
| 4,928,106 | 5/1990 | Ashjaee et al. | 342/352 |
| 5,093,839 | 3/1992 | Kohno et al. | 375/1 |
| 5,108,334 | 4/1992 | Eschenbach et al. | 455/314 |
| 5,185,610 | 2/1993 | Ward et al. | 342/357 |

FOREIGN PATENT DOCUMENTS

| | | | |
|---|---|---|---|
| 0351156A1 | 1/1990 | European Pat. Off. | G01S 5/14 |
| 2153177 | 8/1985 | United Kingdom | G01S 5/14 |

OTHER PUBLICATIONS

G. B. Frank, et al., "Collins Next Generation Digital GPS Receiver," IEEE, 1990, pp. 286–292.
"Low Cost, Dynamic Testing of GPS Receivers", by Volpi et al, Texas Instruments Incorporated, pp. 1–8.
"TI420 Position/Navigation System Product Specification", Texas Instruments Incorporated, May 15, 1988 (Revision C).
*The Oxford English Dictionary*, (Clarendon Press; Oxford, UK; 1989; second ed.), p. 847, definition of "operable".

*Primary Examiner*—Bernarr E. Gregory
*Attorney, Agent, or Firm*—Reneé E. Grossman; Richard L. Donaldson

[57] ABSTRACT

There is disclosed a multi channel GPS digital signal processor on a single IC. Each channel contains circuitry to process L1 or L2 P(Y) and C/A-code signals. In addition a search processor is included to achieve fast signal acquisition. Low power adder/accumulators have been designed to provide for a high precision digital oscillator whose output is synchronous to a high speed clock. The IC contains a full low power null detector and eight correlators to aid in signal acquisition.

73 Claims, 29 Drawing Sheets

CONVENTIONAL ADDER/ACCUMULATOR
FOR DIGITAL OSCILLATOR

CODE CLOCK STATE DIAGRAM FOR 57.792 MHz PLAN

NORMAL 57.792 MHz OPERATION

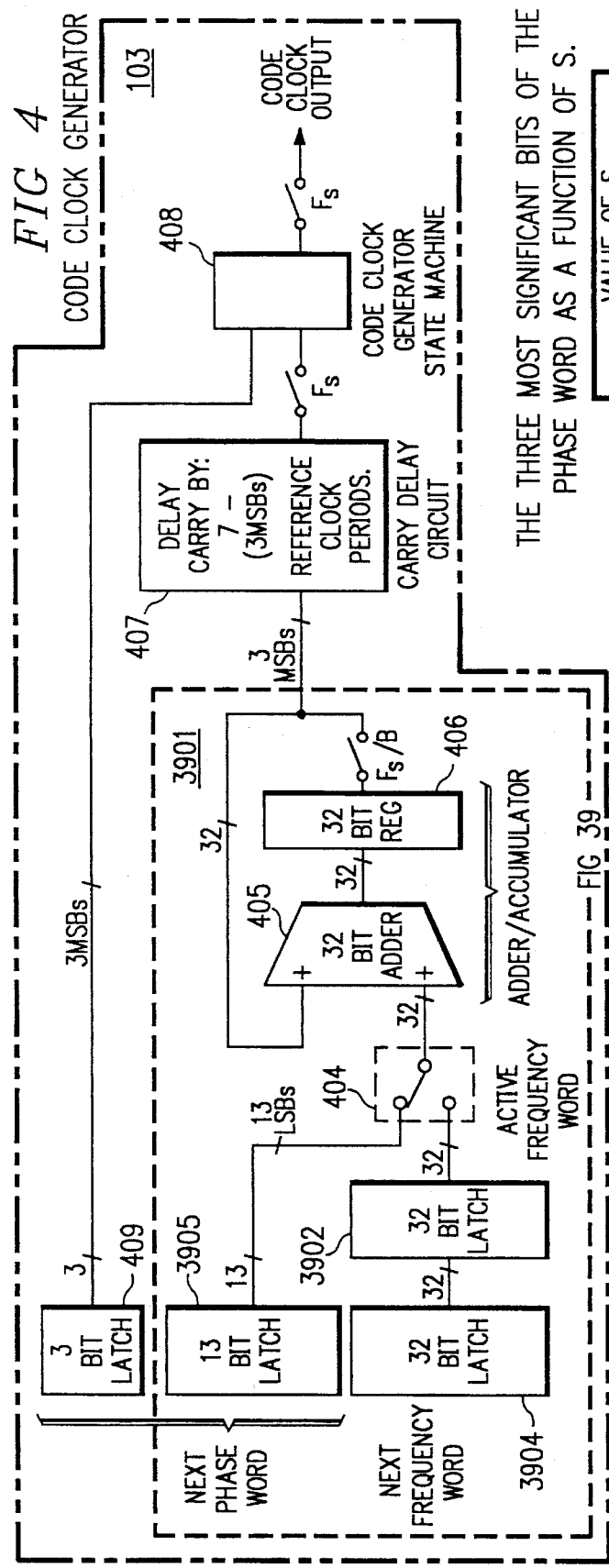

CODE CLOCK STATE DIAGRAM
FOR 40.9216 MHz PLAN

CODE CLOCK STATE DIAGRAM
FOR 40.9200 MHz PLAN

A — NO CARRY
B — CARRY AND HIGH/LOW BIT SET LOW (<10.23 MHz)
C — CARRY AND HIGH/LOW BIT SET HIGH (>10.23 MHz)

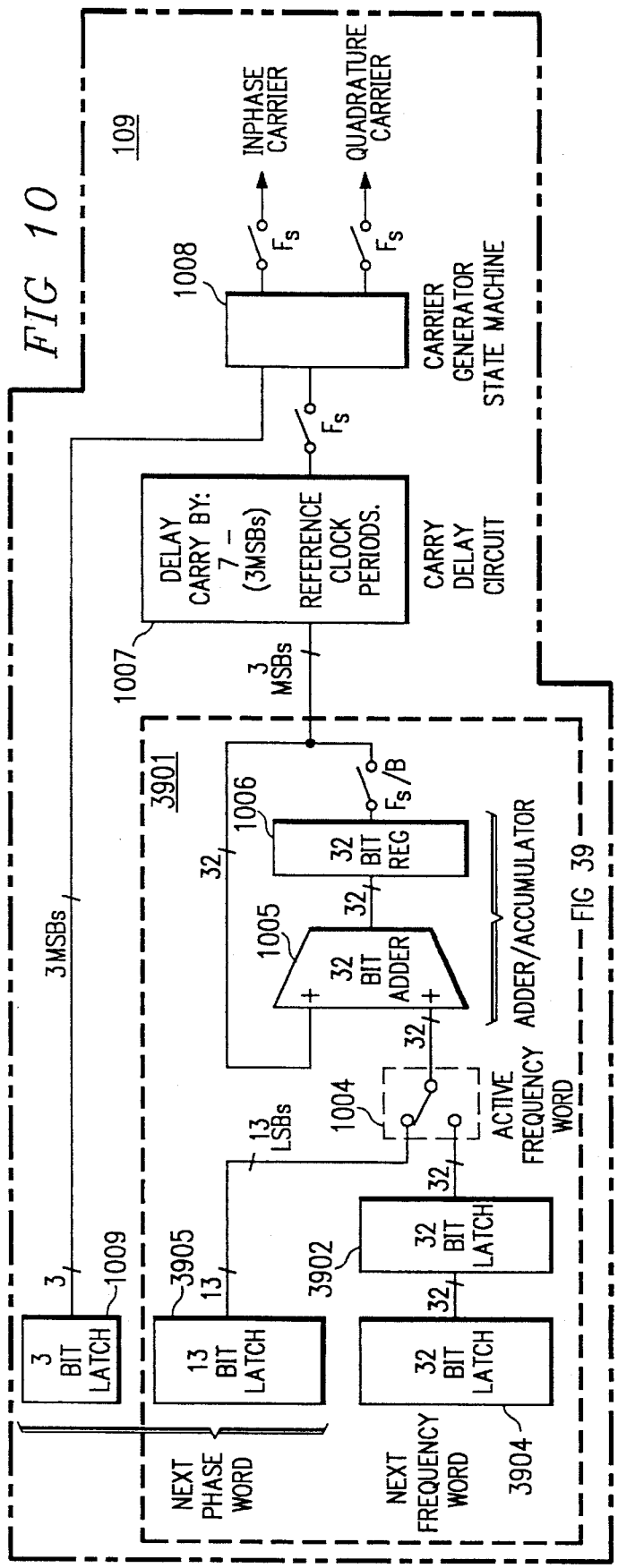

CARRIER GENERATOR STATE DIAGRAM

A — NO CARRY
B — CARRY AND HIGH/LOW BIT SET LOW
C — CARRY AND HIGH/LOW BIT SET HIGH

CARRY DELAY APPROXIMATION PHASE BIAS

FIG. 14
PHASE SETTABILITY AS A FUNCTION OF d
| d | PHASE SETTABILITY 40.92 MHz (NS=8) | 57.792 MHz (NS=6) |
|---|---|---|
| 1 | 45.0 | 60.0 |
| 2 | 22.5 | 30.0 |
| 3 | 15.0 | 20.0 |
| 4 | 11.3 | 15.0 |
| 5 | 9.0 | 12.0 |
| 6 | 7.5 | 10.0 |
| 7 | 6.4 | 8.6 |
| 8 | 5.6 | 7.5 |
| 9 | 5.0 | 6.7 |
| 10 | 4.5 | 6.0 |
| 11 | 4.1 | 5.5 |
| 12 | 3.6 | 5.0 |
| 13 | 3.5 | 4.6 |
| 14 | 3.2 | 4.3 |
| 15 | 3.0 | 4.0 |
| 16 | 2.8 | 3.8 |
| 17 | 2.7 | 3.6 |
| 18 | 2.5 | 3.3 |
| 19 | 2.4 | 3.2 |
| 20 | 2.3 | 3.0 |
| 21 | 2.2 | 2.9 |
| 22 | 2.1 | 2.8 |
| 23 | 2.0 | 2.7 |
| 24 | < 2.0 | 2.5 |
| 25 | < 2.0 | 2.4 |
| 26 | < 2.0 | 2.4 |
| 27 | < 2.0 | 2.3 |
| 28 | < 2.0 | 2.2 |
| 29 | < 2.0 | 2.1 |
| 30 | < 2.0 | 2.0 |
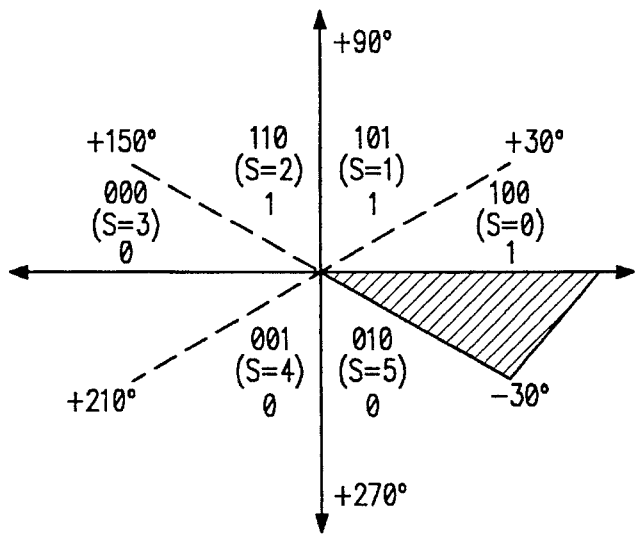
FIG. 18
PHASE RANGE OF EACH STATE IN 57.792 MHz PLAN
▨ REGION WHERE X1 MUST BE INCREMENTED BY 1 BECAUSE FIRST RISING EDGE OF A NEW SET-UP DOES NOT OCCUR.
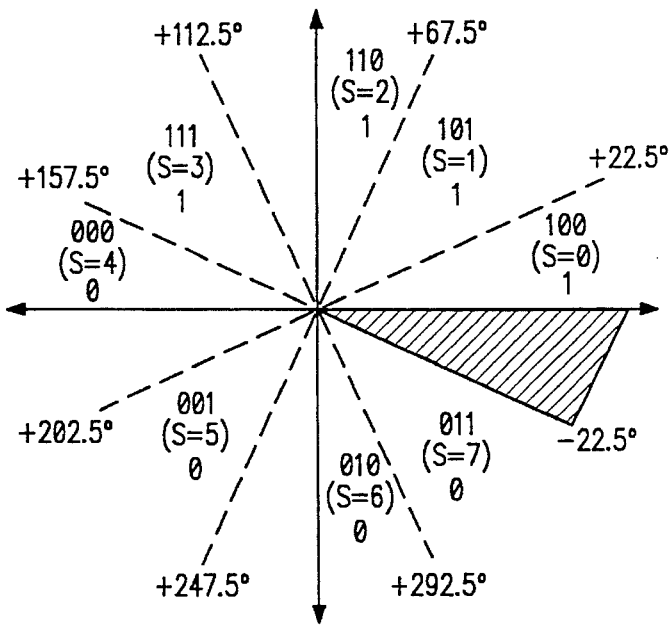
FIG. 19
PHASE RANGE OF EACH STATE IN THE 40.92 AND 40.9216 MHz PLANS
▨ REGION WHERE X1 MUST BE INCREMENTED BY 1 BECAUSE FIRST RISING EDGE OF A NEW SET-UP DOES NOT OCCUR.

PHASE RANGE OF EACH STATE

CARRIER PHASE BIAS BECAUSE OF 2-BIT QUANTIZATION

6-BIT RIPPLE COUNTER WITH TRANSMISSION GATE PULSE INJECTORS

6-BIT RIPPLE COUNTER WITH BOOLEAN PULSE INJECTORS

INTERMEDIATE CORRELATOR MODULE BLOCK DIAGRAM

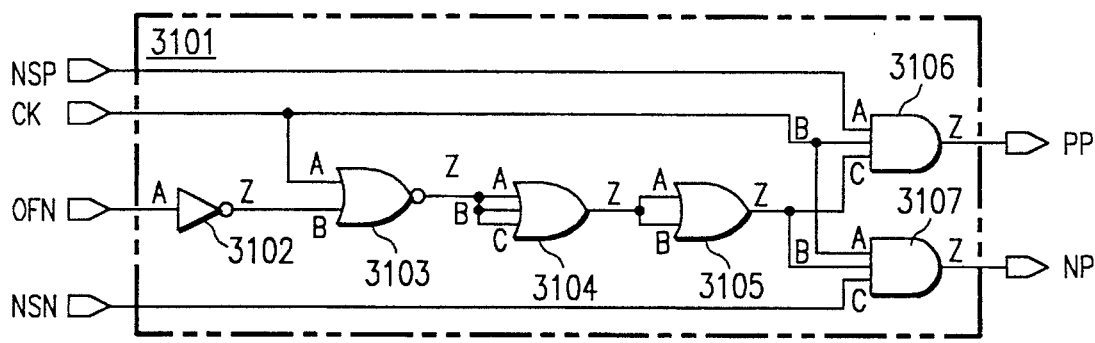

FIG. 31
PULSE GENERATOR

CK – THE REFERENCE CLOCK
OFN – OFF, ASSERTED LOW
NSP – NOISE SIGN POSITIVE, ASSERTED HIGH
NSN – NOISE SIGN NEGATIVE, ASSERTED HIGH
PP – PULSE FOR POSITIVE VALUE ACCUMULATOR
NP – PULSE FOR NEGATIVE VALUE ACCUMULATOR

| DECIMAL | SIGN | MAGNITUDE |
|---|---|---|
| −32 | 1 | 100000 |
| −16 | 1 | 010000 |
| −8 | 1 | 001000 |
| −4 | 1 | 000100 |
| −2 | 1 | 000010 |
| −1 | 1 | 000001 |
| 0 | 0 or 1 | 000000 |
| +1 | 0 | 000001 |
| +2 | 0 | 000010 |
| +4 | 0 | 000100 |
| +8 | 0 | 001000 |
| +16 | 0 | 010000 |
| +32 | 0 | 100000 |

FIG. 32
VALID INPUTS FOR NORMAL OPERATION OF ADDER/ACCUMULATOR

FIG. 35
NON-BINARY MULTIPLE MAGNITUDE VALUES WHICH MAY PRODUCE DETERMINATE RESULTS IN ADDER/ACCUMULATOR

| | |
|---|---|
| 000101 | 5 |
| 001001 | 9 |
| 001010 | 10 |
| 010001 | 17 |
| 010010 | 18 |
| 010100 | 20 |
| 010101 | 21 |
| 100001 | 33 |
| 100010 | 34 |
| 100100 | 36 |
| 100101 | 37 |
| 101000 | 40 |
| 101001 | 41 |
| 101010 | 42 |

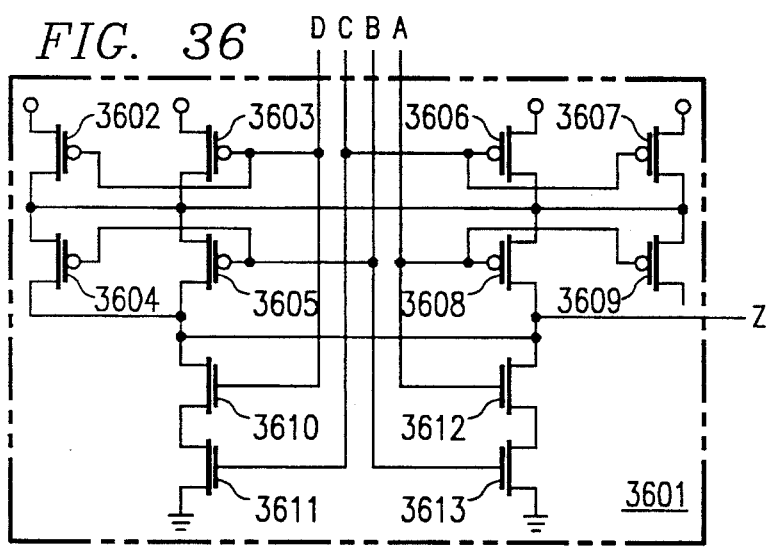

FIG. 36

FIG. 33
AN EXAMPLE OF OPERATION OF PAIRED ADDER/ACCUMULATORS

| STEP | INPUT FROM THE FRONT-END CORRELATOR MODULE 201 | POSITIVE VALUE INTEGRATION | NEGATIVE VALUE INTEGRATION | CARRIES TO THE BACK-END CORRELATOR MODULE 203 |
|---|---|---|---|---|
| START |  | 000000 ( 0) | 000000 ( 0) |  |
| 1 | 1 100000 (-32) | 000000 ( 0) | 100000 (32) | NONE |
| 2 | 0 000100 (+4) | 000100 ( 4) | 100000 (32) | NONE |
| 3 | 1 010000 (-16) | 000100 ( 4) | 110000 (48) | NONE |
| 4 | 1 000010 (-2) | 000100 ( 4) | 110010 (50) | NONE |
| 5 | 0 010000 (+16) | 010100 (20) | 110010 (50) | NONE |
| 6 | 1 010000 (-16) | 010100 (20) | 000010 ( 2) | NEGATIVE |
| 7 | 0 000010 (+2) | 010110 (22) | 000010 ( 2) | NONE |
| 8 | 0 000001 (+1) | 010111 (23) | 000010 ( 2) | NONE |
| 9 | 1 100000 (-32) | 010111 (23) | 100010 (34) | NONE |
| 10 | 1 000100 (-8) | 010111 (23) | 100110 (42) | NONE |
| 11 | 0 100000 (+32) | 110111 (55) | 100110 (42) | NONE |
| 12 | 1 000010 (-2) | 110111 (55) | 101000 (44) | NONE |
| 13 | 0 001000 (+8) | 111111 (63) | 101000 (44) | NONE |
| 14 | 1 100000 (-32) | 111111 (63) | 001000 ( 8) | NEGATIVE |
| 15 | 0 000001 (+1) | 000000 ( 0) | 001000 ( 8) | POSITIVE |

FIG. 34
MAGNITUDE VALUES WHICH ALWAYS CAUSE INDETERMINATE RESULTS IN ADDER/ACCUMULATORS

| | | | | | |
|---|---|---|---|---|---|
| 000011 | 3 | 011100 | 28 | 110011 | 51 |
| 000110 | 6 | 011101 | 29 | 110100 | 52 |
| 000111 | 7 | 011110 | 30 | 110101 | 53 |
| 001011 | 11 | 011111 | 31 | 110110 | 54 |
| 001100 | 12 | 100011 | 35 | 110111 | 55 |
| 001101 | 13 | 100110 | 38 | 111000 | 56 |
| 001110 | 14 | 100111 | 39 | 111001 | 57 |
| 001111 | 15 | 101011 | 43 | 111010 | 58 |
| 010011 | 19 | 101100 | 44 | 111011 | 59 |
| 010110 | 22 | 101101 | 45 | 111100 | 60 |
| 010111 | 23 | 101110 | 46 | 111101 | 61 |
| 011000 | 24 | 101111 | 47 | 111110 | 62 |
| 011001 | 25 | 110000 | 48 | 111111 | 63 |
| 011010 | 26 | 110001 | 49 | | |
| 011011 | 27 | 110010 | 50 | | |

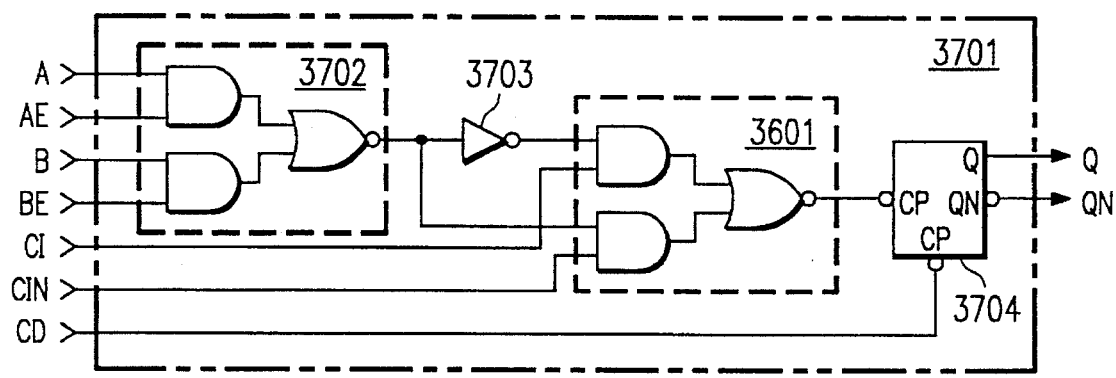
FIG. 37
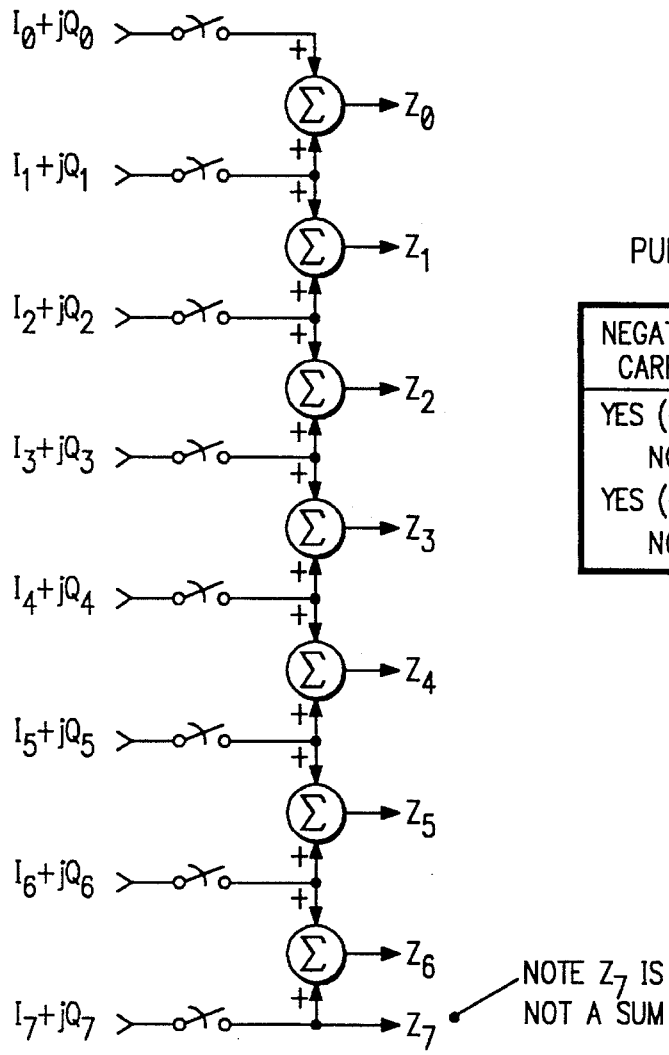
FIG. 44
ADJACENT CORRELATOR PRESUMMING
NOTE: WHEN PRESUMMING IS OFF $Z_i = I_i + jQ_i$
FIG. 42
PULSE ENCODER OPERATION
| NEGATIVE CARRY | POSITIVE CARRY | BIAS | OUTPUT PULSE |
|---|---|---|---|
| YES (−1) | NO | +1 | NONE (0) |
| NO | NO | +1 | +1 |
| YES (−1) | YES (+1) | +1 | +1 |
| NO | YES (+1) | +1 | +2 |
NOTE $Z_7$ IS NOT A SUM

4-BIT ADDER/ACCUMULATOR WITH CARRY

RELATIVE SNR WITH PRE-SUMMING OFF

RELATIVE SNR WITH PRE-SUMMING ON

METHOD AND SYSTEM FOR A MULTI CHANNEL AND SEARCH GLOBAL POSITION SYSTEM SIGNAL PROCESSOR

CROSS REFERENCE TO RELATED APPLICATIONS

This application is a continuation of U.S. application Ser. No. 07/663,968 filed Feb. 28, 1991, and entitled "Method and System for a Multi Channel and Search Global Position System Signal Processor" by Leonard J. LaPadula III, George W. Pawlowski, David W. Rekieta, Hugh L. Scott, Chyi H. Lu, John P. Volpi and Mitchel B. Stiles, now abandoned.

TECHNICAL FIELD OF THE INVENTION

This invention relates to global positioning signalling and more particularly to a device for achieving multi channel and search processing for a global position system.

BACKGROUND OF THE INVENTION

The Navstar Global Positioning System (GPS) is used to determine exact geographic position (i.e., latitude, longitude and altitude) absolute velocity as well as the exact time. The navigation device must calculate the position, velocity and the time by determining distance and relative velocity to a series of satellites. The velocity of the receiver is calculated from the doppler frequency shift of signals transmitted from the satellites. This distance is called range and the doppler shift yields range rate.

A GPS receiver must receive signals generated from a satellite about 11,000 miles away. A GPS satellite transmits about a 6 watt spread spectrum signal. The satellite and receiver, therefore, has to employ spread spectrum techniques to differentiate the signal from the noise. "Spread spectrum" means that the frequency or instantaneous phase of the signal being transmitted changes as a function of time. Using correlation techniques, the receiver can track the spread spectrum signal coming from the satellite by estimating a duplicate image of the signal. A precise match of the satellite's spread spectrum produces a potential signal processing gain of up to 53 decibels. The use of spread spectrum techniques is essential to receive 6 watts of energy transmitted 11,000 miles away. At the antenna, the GPS signal is about 20 dB below ambient cosmic noise.

Prior GPS digital receivers performed signal processing functions in the analog domain thereby requiring many expensive discrete components, some of which needed to be tuned to match the circuitry. A common cost/performance tradeoff was to multiplex or sequence one or two channels.

By digitizing the GPS signal at the final IF stage and performing all channel signal processing functions digitally in a low cost CMOS IC, GPS receiver performance is greatly improved and cost is reduced. Such a system is disclosed in concurrently filed copending patent application Ser. No. 07/662,585, filed Feb. 28, 1991, now U.S. Pat. No. 5,347, 284, entitled "System and Method for a Digital Navigation Satellite Receiver," which patent is hereby incorporated by reference herein.

While the IC presents significant benefit to a GPS receiver, it also presents several problems in building an IC that is low cost and consumes little power. Digitizing the GPS signal at the final IF requires high frequency operation for a signal processing device, i.e. 40 to 60 megahertz for a double sideband GPS signal. Features in a GPS signal processing device which improve performance in hostile environments include full null zone signal integration, multiple correlators, anti-spoofing, and a search processor for fast acquisition.

When all these features are combined in one chip, it is very difficult to meet power consumption goals for the device and to minimize the gate count of the device, thereby minimizing its cost. In addition to the cost of the IC, there is a finite limit to the number of gates which can be put on the IC and thus designing a circuit that will fit on a single IC is difficult.

SUMMARY OF THE INVENTION

We successfully integrated all the aforementioned high performance features into a single IC containing two complete GPS signal processing channels and a search processor for fast acquisition.

In order to meet these high performance requirements, we designed a special adder/accumulator architecture for high speed sample integration compatible with full null zone anti-jamming techniques. A similar architecture also reduces gate count in the carrier and code clock digital oscillators.

We also designed an architecture for correlators which greatly reduces power and gate count. This architecture also supports full null zone and a feature called "adjacent correlator presumming."

Lastly we implemented a digital oscillator architecture which, while running synchronous to the high frequency between 40 and 60 megahertz, the majority of the circuitry runs at one-eighth of that frequency, thereby reducing power.

Accordingly, one technical advantage of our invention is that there is provided an adder/accumulator which supports full null zone and greatly reduces power.

It is a further technical advantage of our invention that a GPS receiver circuit uses a low gate count adder/accumulator for providing a digital oscillator.

It is a further technical advantage of our invention to provide a low power high precision digital oscillator whose output is synchronous to a high speed clock.

It is a further technical advantage of our invention that a complete automonous search processor which implements an 8-point DFT and Tong detection algorithm is included which can control either or both channels during search operations.

It is a further technical advantage of our invention that there are two channels included, each of which can track L1 or L2 P or Y-code and C/A-code simultaneously and that the Y-code generation function is included in the IC.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 4 shows the approach taken for the code clock generator;

FIG. 8 shows state machine operation versus frequency plan;

FIG. 8A shows the three most significant bits of the phase word as a function of S;

FIG. 9 highlights the operational performance of the code clock generator;

FIG. 10 shows a block diagram of the carrier generator;

FIG. 12 highlights operational performance of the carrier generator;

FIG. 14 lists the thirty largest phase settability anomalies;

FIGS. 18 and 19 show the phase range of each state for the code clock generator;

FIGS. 30 and 31 show the pulse generators required for the special adder/accumulator;

FIGS. 32–35 discuss valid inputs for this adder/accumulator;

FIG. 36 shows a special cell which was generated to achieve a balanced rise and fall time;

FIG. 37 shows the special adder/accumulator cell;

FIG. 42 shows how the pulse encoder works;

FIG. 44 describes adjacent correlator presumming;

DETAILED DESCRIPTION OF THE INVENTION

The P-Code Channel on-a-Chip (PCOAC) of the instant invention is a dual channel GPS signal processor integrated circuit. A 95-pin ceramic pin-grid-array (PGA) contains the 348,300 transistor CMOS gate array. Major features include: two independent GPS channels; a search processor for improved acquisition time; an embedded Y-code generator; system synchronization control; and a 16-bit processor interface.

Figure 1:
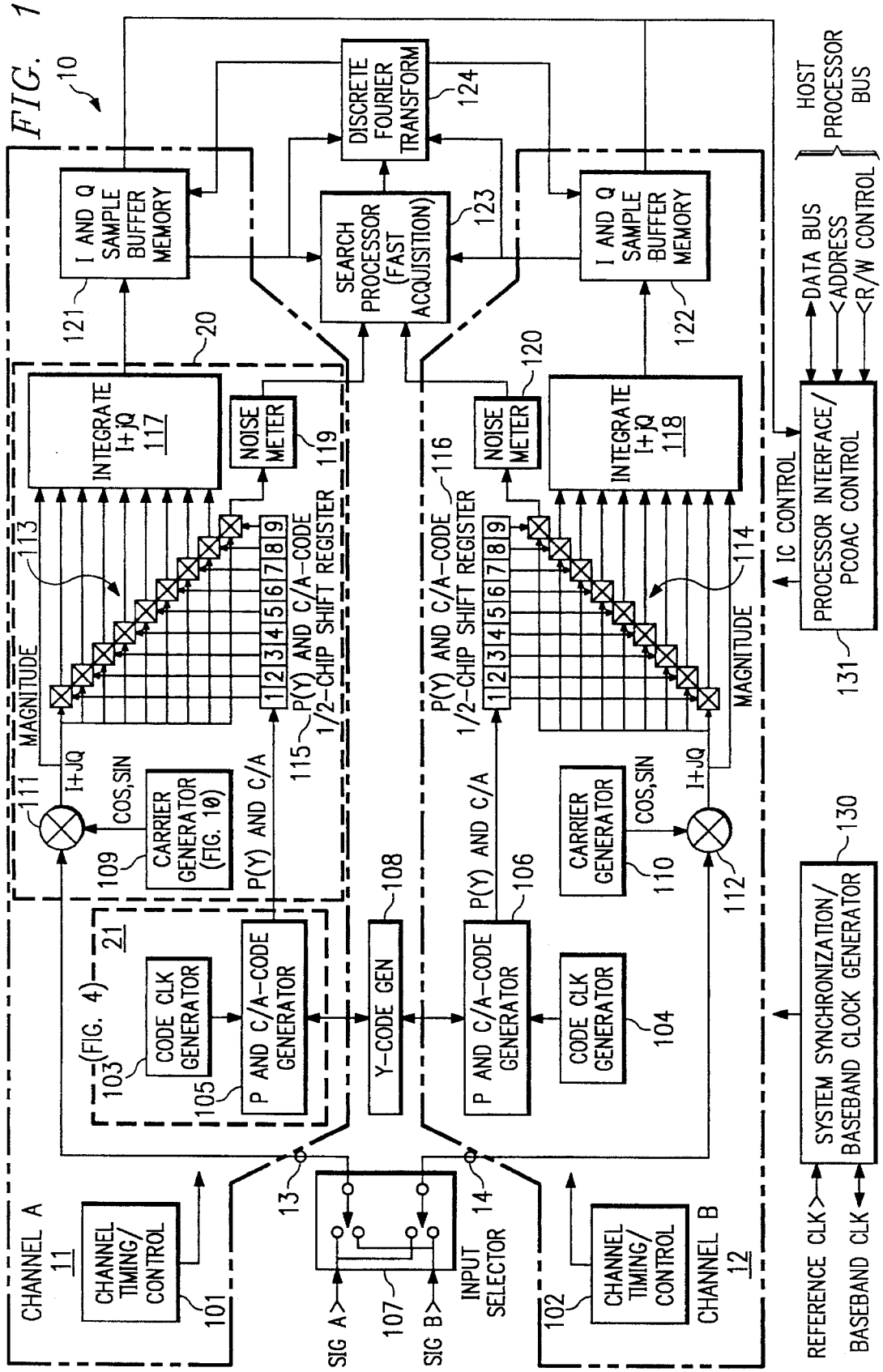
FIGS. 1 and 2 show block diagrams of the system.

FIG. 1 shows a block diagram of PCOAC 10. Unused functions can be turned off allowing for a high level of power conservation in applications where power usage and/or heat dissipation is an important consideration.

Each channel of circuit 10 is a dedicated signal processing circuit which de-modulates the code and carrier of a GPS signal and performs pre-detection integration. Each channel contains a code clock generator 103 (104), a P and C/A-code generator 105 (106), an L1/L2 carrier generator 109 (110), eight correlators 111, 113, 115, 117 (112, 114, 116, 118) and a noise meter 119 (120). Each of the eight correlators can be selected to operate with C/A-code or P-code. A Y-code generator 108 common to both channels provides independent Y-code for both channels.

Search processor 123 and discrete fourier transform (DFT) function 124 improve signal acquisition capability. The DFT separates the sample integration data into seven frequency bins. Search processor 123 interpolates between these seven frequency bins to obtain six additional frequency bins, producing a total of thirteen frequency bins per correlator. The search processor implements a Tong detection algorithm on all eight correlators for each of the thirteen frequency bins resulting in the simultaneous search of 104 search bins per channel.

PCOAC 10 supports three frequency plans, 57.7920 MHz, 40.9216 MHz and 40.9200 MHz operation. Several programmable clocks/interrupts 130 are provided to synchronize the host processor to PCOAC operation. Various interrupt schemes are designed to allow trade-offs to be made between system performance, processor throughput requirements and the complexity of the software.

A standard 16-bit processor interface 131 is utilized. In order to minimize read/write overhead to the PCOAC, integration samples are buffered 121 (122) and the memory map is designed so that block moves are all that is required for channel updates during normal tracking operations.

Figure 2:
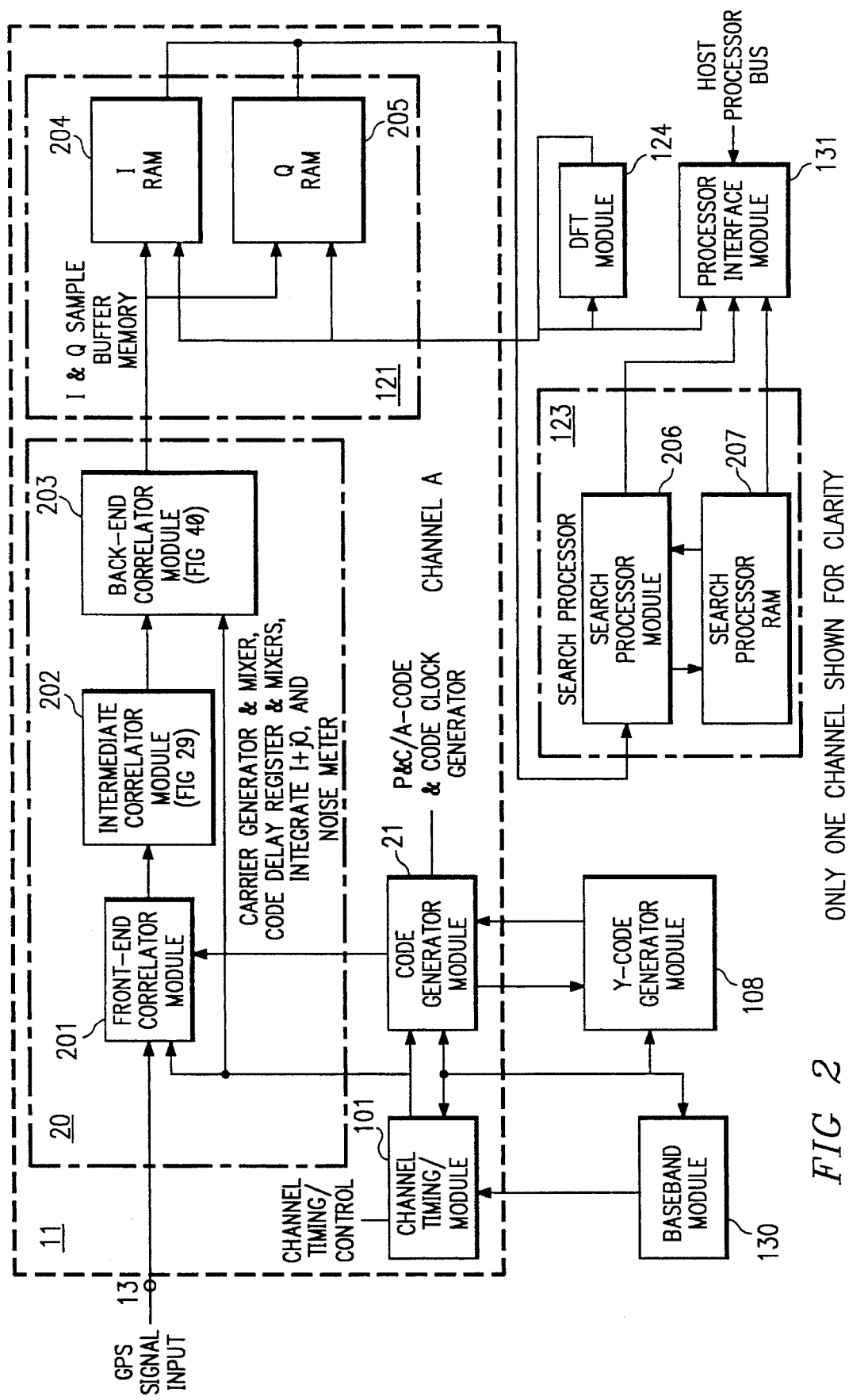

FIG. 2 is a block diagram of the top level modules which electrically make up channel A(11) of PCOAC 10:

Base Band Module 130 generates several global clocks for system synchronization;

Channel Timing Module 101 generates all clocks and synchronization pulses specific to a single channel;

Code Generator Module 21 includes a programmable code clock generator, P-code and C/A-code generators/setters, and P-code and C/A-code state advance and retard for search;

Y-Code Generator Module 108 converts the P-code into Y-code for both channels simultaneously even during code state advances;

Front-End Correlator Module 201 provides L1 or L2 carrier generation, a carrier mixer, a P-code and C/A-code delay shift register (to generate eight code phases), code mixers, data wipe-off, and noise meter signal selection;

Intermediate Correlator Module 202 performs the first stage of sample integration for eight complex correlators and a noise meter;

Back-End Correlator Module 203 performs the final stage of sample integration, and also performs noise measurement for aiding in search and tracking (one per channel);

I RAM 204 and Q RAM 205 are two 64×16-bit 3-port RAMs per channel for sample integration buffering or to hold intermediate values for DFT calculations;

Discrete Fourier Transform (DFT) Module 124 converts integration samples from all correlators of both channels into seven frequency bins of sample data for search operations;

Search Processor Module 206 interpolates six additional frequency bins from those provided by the DFT module, performs Tong detection on all thirteen frequency bins of data and retards the code state until a signal is found;

Search Processor RAM 207 is a 64×16-bit 3-port RAM used by the search processor as a holding register for active Tong counts during search or noise measurement buffering during tracking;

Processor Interface Module 131 provides address decode to generate internal read and write strobes, integration sample buffering control, a programmable ring oscillator for test and other miscellaneous functions;

Digressing momentarily in order to receive spread spectrum signals, as in a GPS receiver, it is necessary to very closely match the signal generated by the signal source (i.e., the satellite). In GPS, two precisely controllable digital oscillators are required per channel, one to match the code frequency (nominally 10.23 MHz) and one to match the final carrier IF (between 10.1 and 15.1 MHz depending on receiver configuration). To meet nyquist sampling requirements, the PCOAC samples incoming signals at greater than 40 MHz (up to 57.792 MHz depending on which frequency plan is implemented in the receiver).

Figure 3:
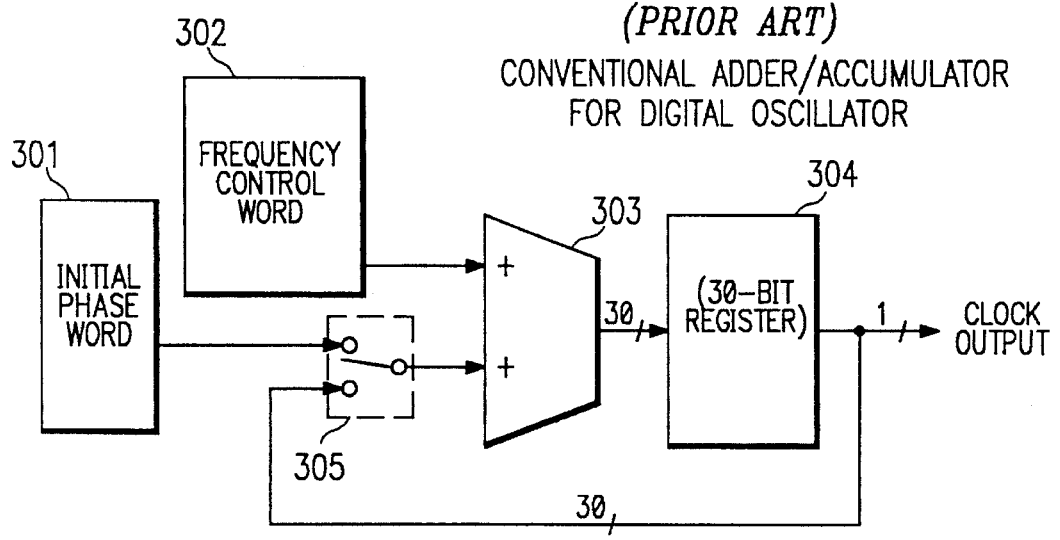
FIG. 3 shows the prior art of a conventional adder/accumulator digital oscillator.

FIG. 3 shows the most straightforward way (prior art) to implement a high precision digital oscillator, whose output is synchronous to a high speed clock. The circuit uses a loadable adder/accumulator 303, 304 & 305, pipelined as required. This approach was used in a single C/A-code channel on a chip previously developed.

Since this device sampled incoming signals at only 12.799 MHz, power was less of a consideration than gate count. However, if on the PCOAC an adder/accumulator of adequate precision (32-bits) were to run a 57.792 MHz, it would consume about 150 mW of power. Since on the PCOAC, four such adder/accumulators are required (two per channel), total power consumed by these digital oscillators would be 600 mW.

Using an innovative low power approach, each digital oscillator in PCOAC 10 consumes only 43 mW on average at 57.792 MHz, saving a total of 428 mW per PCOAC or a total of 1.3 watts in a six channel receiver. Unlike the adder/accumulator digital oscillator approach, this approach limits the output frequency of the digital oscillator to a limited range about a center frequency. The more narrow that range is, the more power that can be conserved. Also, this approach requires slightly more gates than the conventional approach (roughly 5 to 30 percent more depending on the number of bits of precision and other design specifics).

As shown in FIGS. 4 and 10, this innovative approach is used in the PCOAC for code clock generator 103 (FIG. 4) and carrier generator 109 (FIG. 10). An approximation of a part of this approach is used for circuit simplification, causing some phase settability anomalies. Also, the carrier generator generates two 2-bit outputs 90° out of phase. These 2-bit outputs cause some additional phase settability anomalies.

Code clock generator 103 shown in FIG. 4 is designed to generate a P-code clock with a nominal frequency of 10.2300 MHz. Phase and frequency of the P-code clock is programmable via processor interface 131 (FIG. 1) and bit latches 3904, 3905, 409.

FIG. 9 shows the frequency range, frequency settability, and phase settability for the three reference clock frequencies of PCOAC 10.

The code clock output is generated by dividing down the reference clock by a programmable non-integer divisor. For example, in the 57.792 MHz plan, the reference clock is divided down by 5.649266862 to generate a code clock with a frequency of 10.23 MHz. To minimize power consumption, the code clock generator is designed to run a minimum of circuitry at reference clock frequency. Most of the code clock generator circuitry runs at one eighth the reference clock frequency. The benefit of low power is a tradeoff in performance in phase settability at certain frequencies.

State machine 408, which runs at the reference clock frequency, generates the final code clock output. Averaged over time, it divides the reference clock down by the desired divisor. On each reference clock active edge, the state machine advances the phase of the code clock by a fixed number of degrees. A carry input to the state machine modifies the number of degrees the code clock is advanced on a given reference clock active edge.

Figure 5:
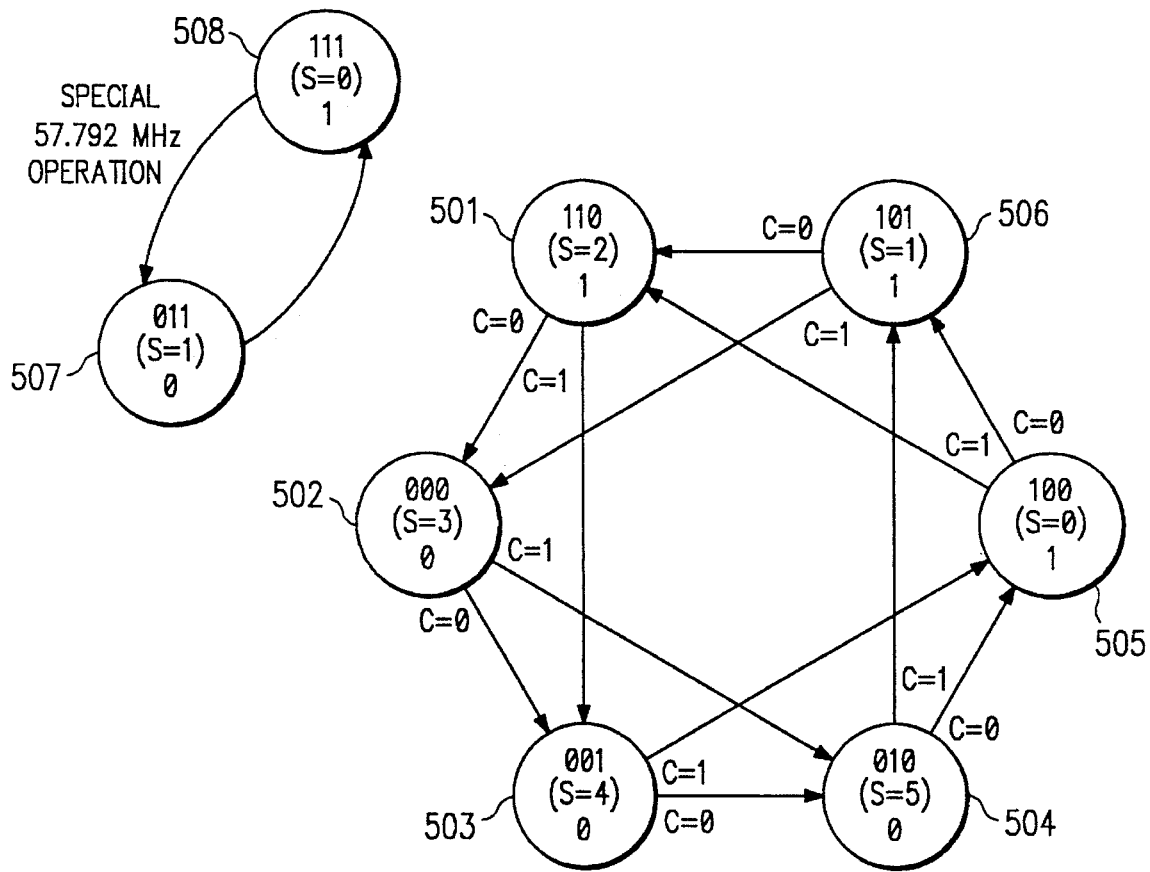
FIGS. 5, 6 and 7 show state diagrams for the code clock generator.
Figures 6, 7:
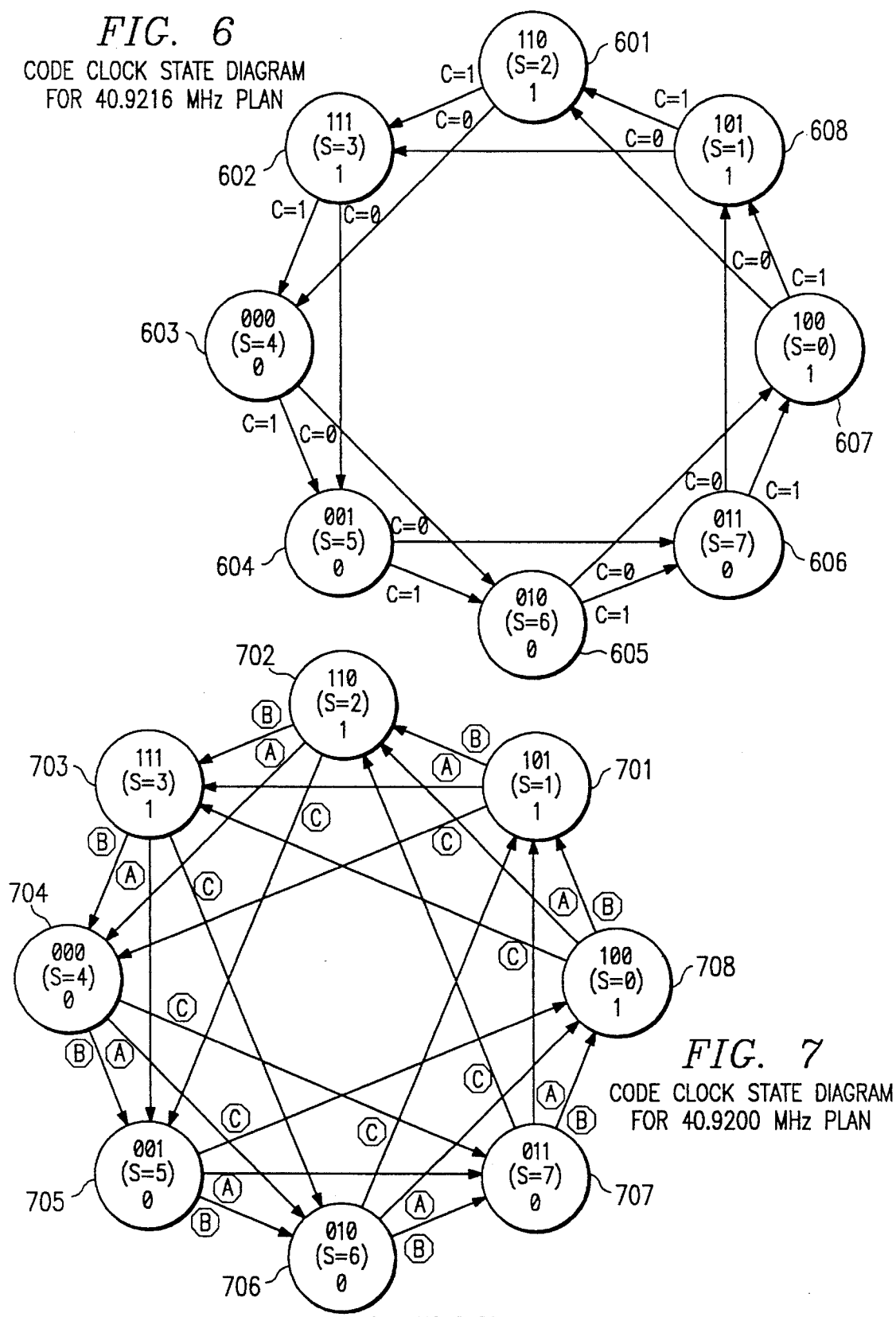

FIG. 8 shows the number of degrees the code clock phase is advanced on each reference clock and as a result of each carry for each of the three frequency plans. This state machine is further illustrated in FIGS. 5, 6 & 7 for the 57.792 MHz plan, the 40.9216 MHz plan and the 40.9200 MHz plan, respectively. The phase advance assigned to each reference clock period and to each carry and the frequency of carries determines the average frequency of the code clock output.

Returning to FIG. 4 (or FIG. 10), 32-bit adder/accumulator 3901 determines the frequency of the carry input to the state machine. The 32-bit adder/accumulator is clocked once every eighth reference clock. Each time it is clocked, a frequency word provided by the host processor is added to the value held in the accumulator. Every time the accumulator rolls over, a carry signal is generated to the state machine. Therefore, the frequency of carries is calculated as follows:

$$Fcarry = \frac{Fref}{8} \times \frac{FW}{2^{32}} \quad (1)$$

where Fcarry is the frequency of carries, Fref is the reference clock frequency and FW is the 32-bit frequency word provided by the host processor.

The average frequency of the code clock output is calculated as follows:

$$\begin{aligned} Fcdclk &= Fref \times \frac{PAref}{360} + Fcarry \times \frac{PAcarry}{360} \\ &= Fref \times \frac{PAref}{360} + \frac{Fref}{8} \times \frac{FW}{2^{32}} \times \frac{PAcarry}{360} \\ &= Fref \times \frac{(PAref + FW/2^{35} \times PAcarry)}{360} \end{aligned} \quad (2)$$

where PAref is the phase advance per reference clock and PAcarry is the phase advance per carry (see FIG. 8). Solving this equation for the frequency word (FW) yields the following equation.

$$\begin{aligned} FW &= \frac{2^{35}}{PAcarry} \left[ 360 \times \frac{Fcdclk}{Fref} - PAref \right] \\ &= \left[ Fcdclk - \left[ \frac{Fref}{360} \times PAref \right] \right] \times \left[ \frac{2^{35}}{PAcarry} \times \frac{360}{Fref} \right] \end{aligned} \quad (3)$$

Carry delay circuit 407 improves instantaneous phase resolution and reduces frequency dependent phase bias. Each carry is delayed a number of reference clocks from the time the adder/accumulator rolls over depending on by how much the adder/accumulator overflows. Ideally, the carry should be delayed by:

$$Dcarry = INT(8 \times (1 - AW/FW)) \quad (4)$$

where AW is the value of the word in the accumulator after it rolls over and Dcarry is the number of reference clocks to delay the carry. This approach causes a carry to occur eight reference clocks after when it would occur in a conventional adder/accumulator digital oscillator. This approach exactly matches the ideal performance of a digital oscillator with its adder/accumulator running at reference clock frequency, but uses less power because its adder/accumulator is running at one eighth the reference clock frequency.

Implementing the ideal carry delay described above would be difficult, therefore an approximation is implemented. The approximation implement delays the carry in accordance with the following equation:

$$Dcarry = 8 - INT(AW/2^{29}) \quad (5)$$

where Dcarry is the number of reference clocks the carry is delayed. The reason this approximation is not exact for the full range of the frequency word is that the value left in the accumulator after a carry will never be greater than the frequency word, thus limiting the range of reference clock periods by which the carry is delayed.

As the frequency word approaches zero, the carry delay is always eight; however, carries are infrequent and therefore phase bias approaches zero. As the frequency word approaches $2^{32}-1$, carries occur frequently, but the carry delay approaches the correct number of reference clock periods. This is proved by substituting $2^{32}$ for FW into the equation showing the ideal carry delay algorithm, as follows:

$$\begin{aligned} Dcarry &= INT(8 \times (1 - AW/2^{32})) \quad (6)\\ &= INT(8 - AW/2^{29})\\ &= 8 - INT(AW/2^{29}) \end{aligned}$$

Figure 13:
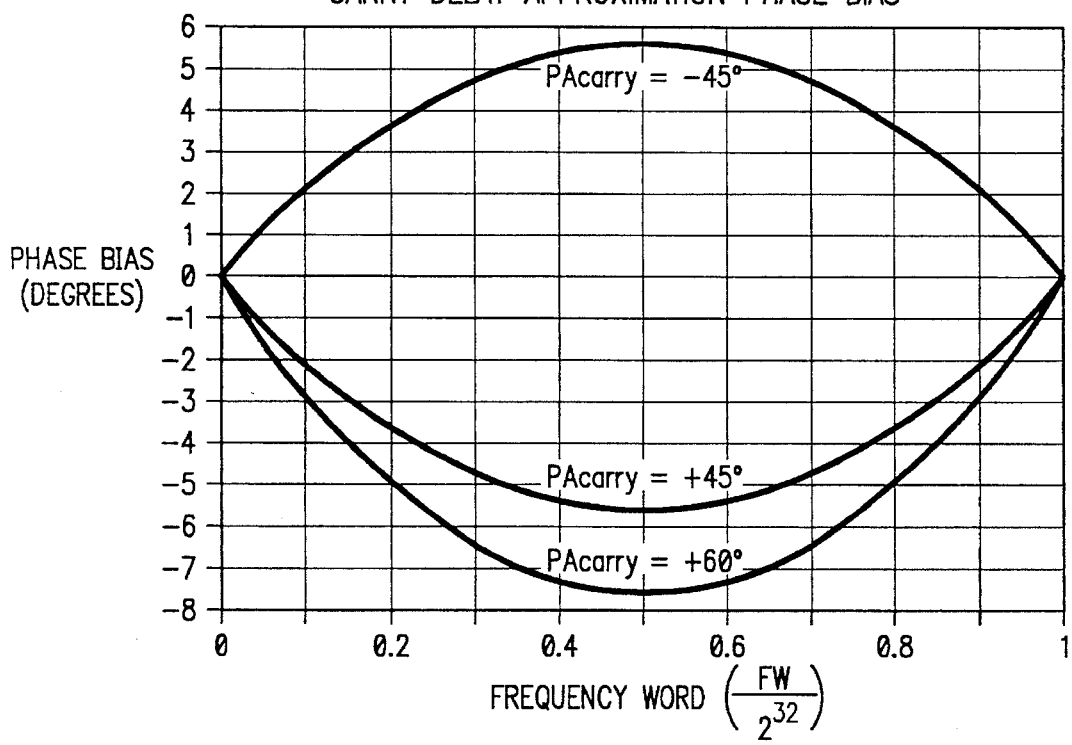
FIG. 13 shows frequency dependent phase bias.

The phase bias as a function of the frequency word caused by approximating the carry delay is given below:

$$PBcda = \frac{-PAcarry \times FW \times (FW/2^{32} - 1)}{2^{33}} \quad (7)$$

where PBcda is the phase bias as a result of the carry delay approximation. FIG. 13 illustrates this bias.

This phase bias does not degrade closed loop tracking performance. However, it may be important to consider for measuring absolute phase of a signal (for example to generate a precision time mark) or for measuring the relative phase between two signals when the difference between their doppler is significant.

To setup initial phase of the code clock, the host processor provides the initial state of the state machine and the initial value of the thirteen most significant bits of the accumulator. The remaining nineteen bits of the accumulator are set to zero when a new code phase takes effect.

Since the state machine has either six or eight discrete states, each state represents a range of phase. Since state $100_2$ is the state where the clock output changes from zero to one, this state represents an average phase of zero degrees. The range of phase it represents is $-30$ to $+30$ degrees for the 57.792 MHz plan and $-22.5$ to $+22.5$ degrees for the 40.9216 and 40.9200 MHz plans.

FIGS. 18 and 19 illustrate the phase range of each state for the 57.792 MHz plan and the 40.9216 and 40.9200 MHz plans respectively. In other words, instantaneous phase is a function of what state the state machine is in and the value held in the accumulator. Assuming the average value held in the accumulator is $2^{31}$ (half of the maximum value), then phase is expressed by the following equation:

$$Pcdclk = 360 \times \frac{S}{NS} + PAcarry \times \left[ \frac{AW}{2^{32}} - \frac{1}{2} \right] \quad (8)$$

where Pcdclk is the code clock phase, NS is the number of states in the state machine, S is the state of the state machine, and AW is the value of the word in the accumulator at any time. S=0 is defined as the state where the code clock goes high and all remaining states are numbered sequentially going counter clockwise (see FIGS. 5, 6 and 7).

For a desired phase, the host processor provided phase word can be calculated from the following equations. The initial state of the state machine, S, is calculated first using the following equation:

$$S = MOD \left[ INT \left[ \frac{NS \times Pcdclk}{360} + \frac{1}{2} \right], NS \right] \quad (9)$$

where NS is the number of states in the state machine, Pcdclk is the desired code clock phase (must be positive) and S is the state that the state machine must be initialized to. After S is calculated, AW is calculated using the following equation:

$$AW = 2^{32} \times MOD \left[ \frac{Pcdclk}{PAcarry} - \frac{360 \times S}{PAcarry \times NS} + \frac{1}{2} + 8, 1 \right] \quad (10)$$

where PAcarry is phase advance per carry (see FIG. 8) and AW is the value the adder/accumulator must be initialized to. In this equation, eight is added to force the value of the expression to be positive before taking the modulo. The phase word which the host processor must write out is a function of the initial state of the state machine, S, and the initial state of the adder/accumulator, AW. The three most significant bits of the phase word determine the initial state of the state machine.

FIG. 8A shows the value of the three most significant bits of the phase word as a function of S for all setups. This is derived directly from FIGS. 5, 6 and 7 which show the state assignments for the state machine for each frequency plan. The thirteen least significant bits of the phase word determine the initial state of the thirteen most significant bits of the accumulator; the remaining accumulator bits are set to zero. The following equation shows the value of the thirteen least significant bits of the phase word as a function of AW:

$$PW(13 \; lsbs) = INT \left[ \frac{AW}{2^{19}} \right] \quad (11)$$

A more direct way to calculate the phase word involves using a simple equation and then modifying the result as required. The equation is:

$$PW = MOD \left[ \frac{Pcdclk}{360} + \frac{1 + NS}{2 \times NS}, 1 \right] \times \frac{NS}{8} \times 2^{16} \quad (12)$$

Then the result is modified as follows:

IF PAcarry<0 THEN PW=PW EXOR 8191 (invert 13 least significant bits)

IF NS=6 AND PW≧24576 THEN PW=PW+8192

This yields the final phase word for the host processor to write out.

During the development of this invention, a problem was found in that the phase is not always finally settable. There fare phase settability anomalies depending upon the frequency to which the digital oscillator is set. A description of this problem follows.

Code clock average phase is calculated based on the assumption that the average value of the adder/accumulator during a sample integration period is half the maximum value possible (a previous assumption). This is not true in all cases. Code clock phase is actually calculated using the following equation for all cases:

$$Pcdclk = 360 \times \frac{S}{NS} + PAcarry \times \left[ \frac{AW - AA}{2^{32}} \right] \quad (13)$$

where AA is the average value of the adder/accumulator for a sample integration period.

The average value of the adder/accumulator for a sample integration period is a function of the frequency word and the initial state of the adder/accumulator and is calculated using the following equation:

$$AA = \frac{1}{N} \sum_{i=0}^{N} MOD(AW + i \times FW, 2^{32}) \quad (14)$$

where N is the number of times the adder/accumulator is incremented in a sample integration period.

For most frequency words, as N approaches infinity, the average adder/accumulator value is very close to $2^{31}$ and is not effected by the initial adder/accumulator value (AW). However, certain specific frequency words cause the average adder/accumulator value to be a function of the initial adder accumulator value. When this occurs, a phase settability anomaly occurs.

The frequency words which cause a phase settability anomaly, and the degree to which phase settability is effected can be determined as follows:

1) Reduce the following fraction as much as possible:

$$\frac{n}{d} = \frac{FW}{2^{32}} \quad (15)$$

where n is the numerator of the reduced fraction and d is the denominator of the reduced fraction.

2) Phase settability is calculated by the following equation:

$$P_{stby} = \frac{360}{NS \times d} \quad (16)$$

where $P_{stby}$ is the phase settability and NS is the number of states in the state machine.

For example, when the frequency word is zero (n=0 and d=1), the adder/accumulator remains at its initial state for the entire sample integration period, thus AA=AW. When AW is substituted for AA in the equation 14, then code clock phase is no longer a function of the initial adder/accumulator value, but only of the initial state of the state machine. This causes a phase settability anomaly, which when the frequency word is zero, does not allow phase settability to a finer resolution than 360 divided by the number of states in the state machine (45° for the 40.9200 and 40.9216 MHz plans and 60° for the 57.792 MHz plan).

Other frequency words will result in a finite number of discrete adder/accumulator values evenly spaced apart. For example, if the frequency word is $2^{31}$ (n=1 and d=2) then the value held in the adder/accumulator at any time is one of two values:

$$AW \text{ or } MOD (AW+2^{31}, 2^{32}). \quad (17)$$

In this case the average value of the adder/accumulator is:

$$AA = \frac{AW + MOD(AW + 2^{31}, 2^{32})}{2} \quad (18)$$

Thus another phase settability anomaly occurs when the frequency word is $2^{31}$ in which the phase settability is:

$$P_{stby} = \frac{360}{NS \times 2} \quad (19)$$

(22.5° for the 40.9200 and 40.9216 MHz plans and 30° for the 57.792 MHz plan).

FIG. 14 shows the phase settability for all values of d which yield a phase settability of 2 degrees or greater.

Figure 15:
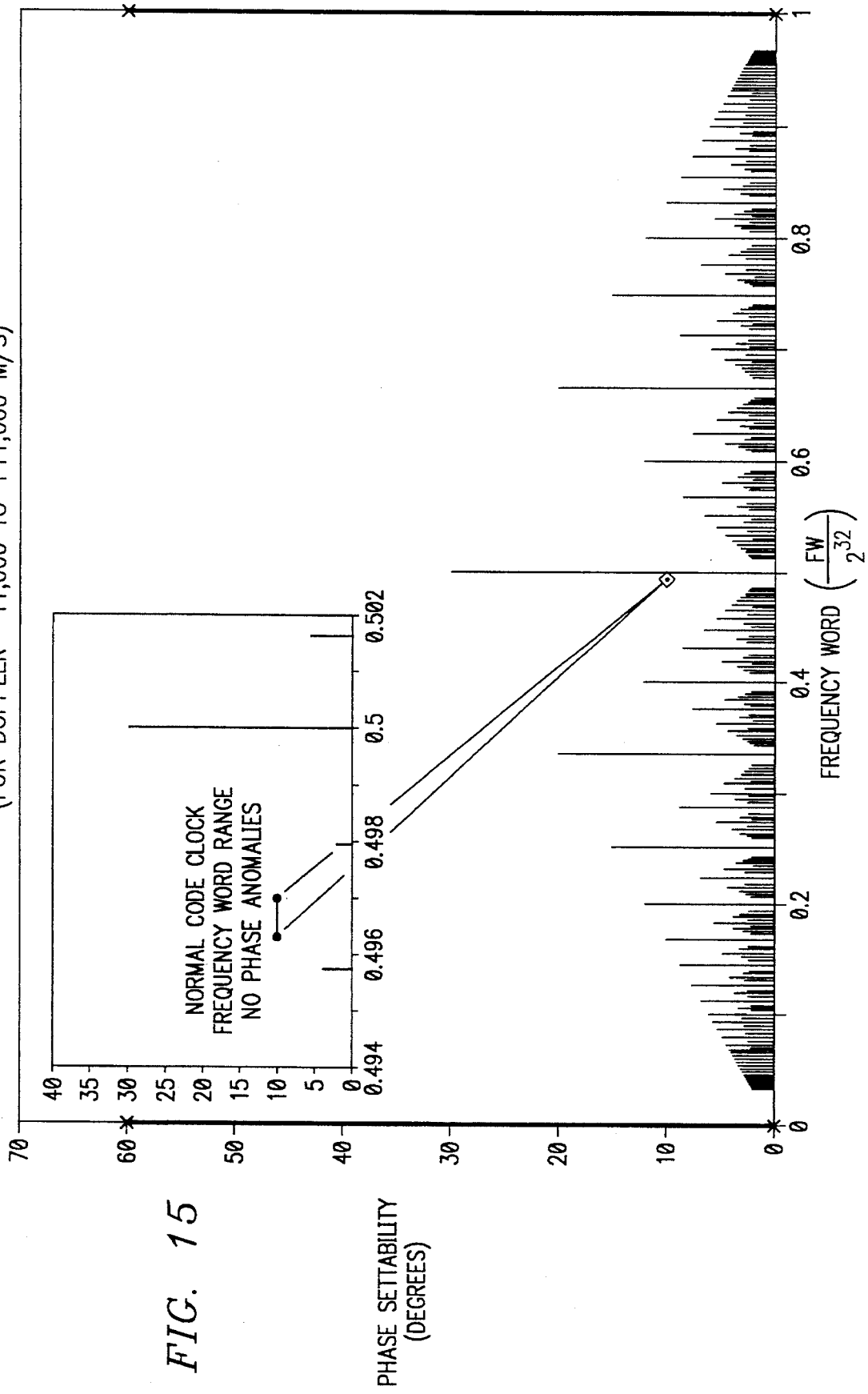
FIGS. 15, 16 and 17 show the phase settability anomalies for the code clock generator.
Figure 16:
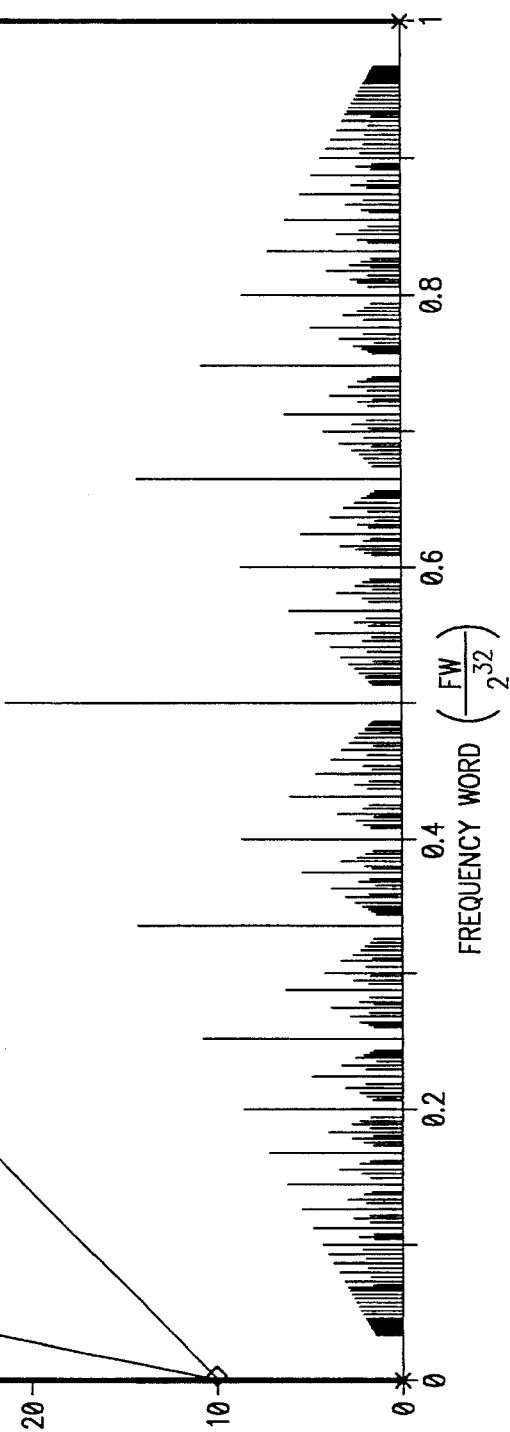
Figure 17:
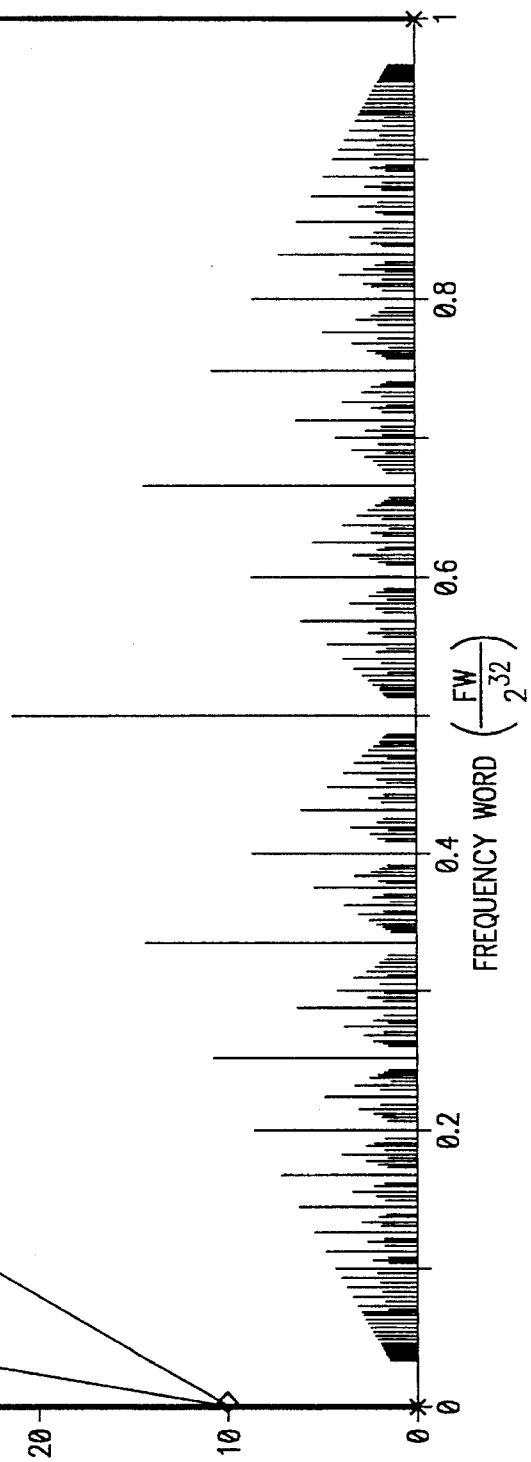

FIGS. 15, 16 & 17 graph these phase settability anomalies with normal code clock generator operating range superimposed for the 57.792 MHz plan, the 40.9216 MHz plan and the 40.9200 MHz plan, respectively. Values of d which are not binary multiples are not strictly attainable; however, since the sample integration period is not infinite, values for d which are not a binary multiple are effectively attainable.

Turning now to FIG. 10, carrier generator 109 creates an inphase (I) and quadrature (Q) replica of the L1 or L2 intermediate frequency (IF) carrier signal. The output of the carrier generator, called carrier, is generated synchronous to the reference clock. The inphase (I) and the quadrature (Q) parts of the carrier are each two bits. Phase and frequency of the carrier is programmable via the host processor.

FIG. 12 shows the frequency range, frequency settability, and phase settability for the three reference clock frequencies supported by the PCOAC.

The carrier is generated using the same principle as is used for generating the code clock. The state machine for the carrier generator operates using the same principle as for the code clock generator state machine. State assignments for the carrier generator are the same for all three PCOAC supported frequency plans. The carrier phase advances 90° per reference clock and either 45° or −45° per adder/accumulator carry. The 45° phase advance or retard per carry (PAcarry) is controlled by a high/low frequency control bit.

Figure 11:
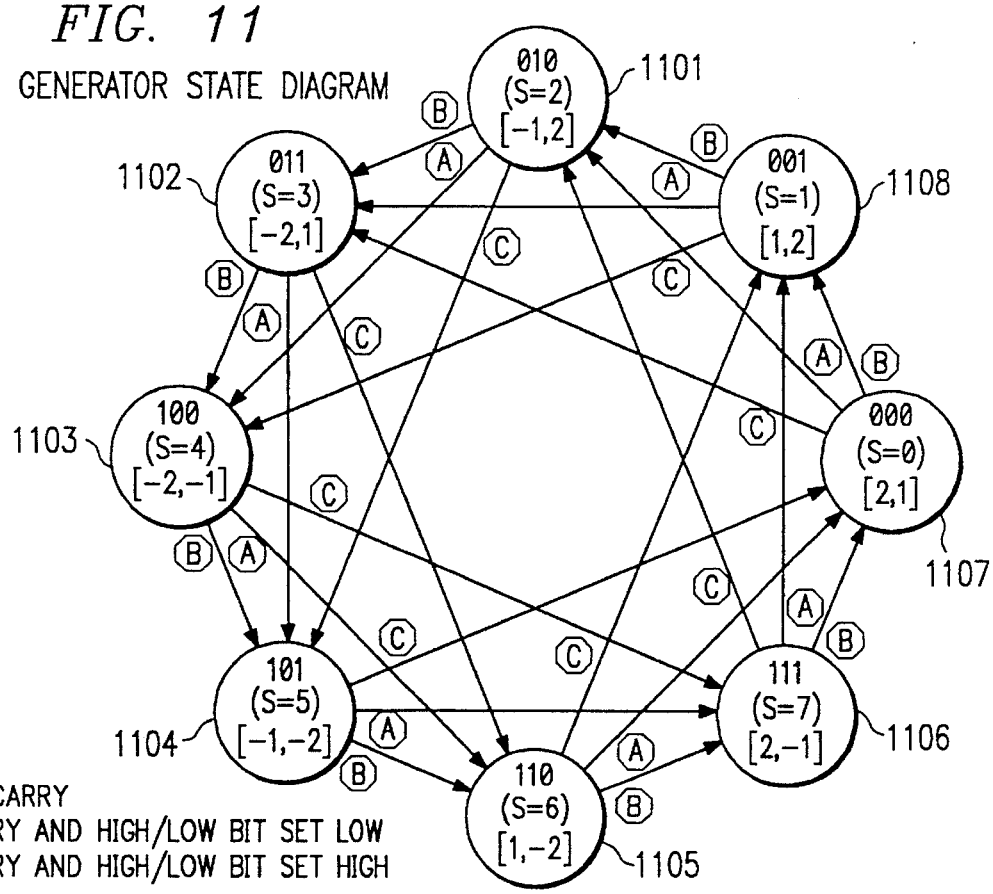
FIG. 11 shows the carrier generator state diagram.

FIG. 11 shows the complex carrier output as a function of state. Note that the state machine generates a 2-bit number for each part of the complex carrier at each state. These two bit numbers can either be a −2, −1, +1 or +2. The host processor can set a bit which hard limits the output to +1 and −1. The quadrature carrier lags the inphase carrier by 90 degrees.

The adder/accumulator for the carrier generator is exactly the same as for the code clock generator.

The average frequency of the carrier output is calculated as follows:

$$Fcarrier = \frac{Fref}{360} \left( 90 + \frac{FW}{2^{35}} \times PAcarry \right) \quad (20)$$

where Fcarrier is average frequency of the carrier, Fref is the reference clock frequency, FW is the 32-bit frequency word provided by the host processor and PAcarry is the phase advance per carry (+45 or −45).

The carry delay circuit for the carry generator is the same as it is for the code clock generator. The frequency depend phase bias caused by this delay circuit is calculated the same as for the code clock generator. Carrier phase is controlled the same way as code clock phase.

Figure 20:
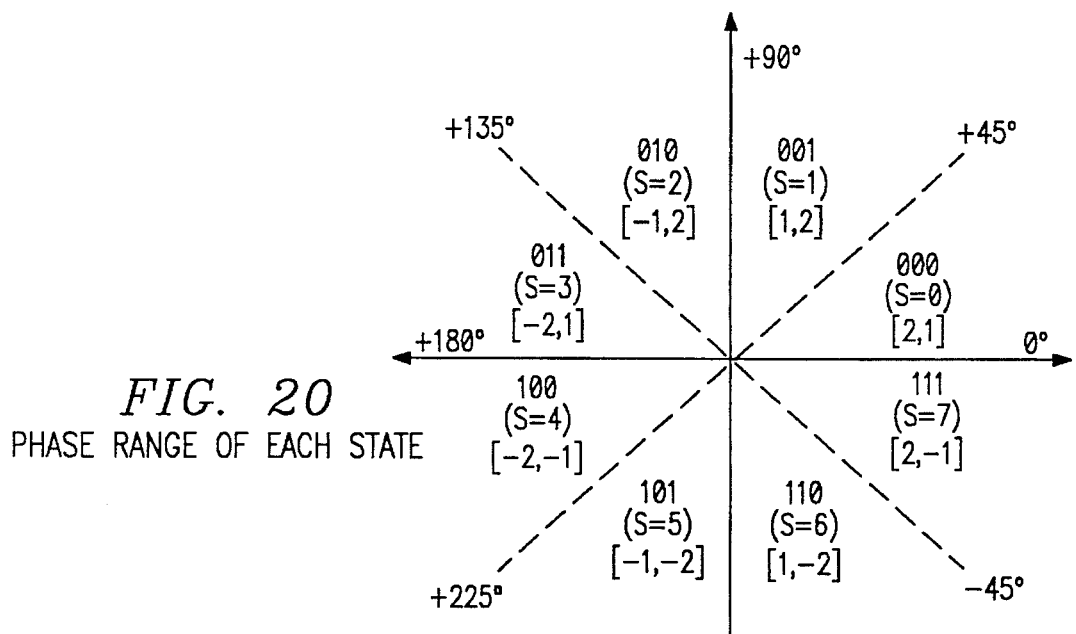
FIG. 20 shows the same for the carrier generator.

The state machine has eight states. Each state represents a phase range of 45 degrees. State 000 represents an average phase of 22.5 degrees. The range of phase which it represents is 0 to +45 degrees. FIG. 20 illustrates the phase range of each state. Assuming the average value held in the accumulator is $2^{31}$ (half of the maximum value), the carrier phase is expressed by the following equation:

$$Pcarrier = 45 \times S + 22.5 + PAcarry \times \left[ \frac{AW}{2^{32}} - \frac{1}{2} \right] \quad (21)$$

where Pcarrier is the carrier phase, S is the state of the state machine as defined in FIG. 11, and AW is the current content of the adder/accumulator.

The host processor sets the initial state of the state machine and the thirteen most significant bits of the accumulator. For a desired phase, the phase word can be calculated from the following equations. The initial state of the state machine, S, is calculated first using the following equation:

$$S = MOD\left[ INT\left[ \frac{Pcarrier}{45} \right], 8 \right] \quad (22)$$

where Pcarrier is the desired carrier phase and S is the state that the state machine must be initialized to as defined in FIG. 11. After S is calculated, AW is calculated using the following equation:

$$AW = 2^{32} \times MOD\left[ \frac{Pcarrier}{PAcarry} + 8, 1 \right] \quad (23)$$

where PAcarry is the phase advance per adder/accumulator carry (−45 or +45 degrees) and AW is the value the adder/accumulator must be initialized to. In this equation, eight is added to force the value of the expression to be positive before taking the modulo. The phase word which the host processor must write out is a function of the initial state of the state machine, S, and the initial state of the adder/accumulator, AW. The three most significant bits of the phase word determine the initial state of the state machine. The thirteen least significant bits of the phase word determine the thirteen most significant bits of the accumulator; the remaining bits of the accumulator are set to zero. The following equation shows the phase word as a function of S and AW:

$$PW = S \times 2^{13} + INT\left[ \frac{AW}{2^{19}} \right] \quad (24)$$

A more direct way to calculate the phase word involves using a simple equation and then modifying the result as required. For Pcarrier from 0° to less than 360°, the equation is:

$$PW = 2^{16} \times \frac{Pcarrier}{360} \quad (25)$$

Then the result is modified as follows:

IF PAcarry<0 THEN PW=PW EXOR 8191 (invert 13 least significant bits)

There are two contributors to carrier phase settability anomalies, the adder/accumulator carry delay circuit and the unequal spacing of states due to having four output levels. Phase settability anomalies resulting from the carry delay circuit have been previously described. Only phase settability anomalies resulting from the unequal spacing of states will be described now.

The carrier generator state machine has eight states. Ideally these states would be evenly spaced 45 degrees apart. Because the carrier generator has four output levels (−2, −1, +1 and +2), the states are not evenly spaced.

Figure 21:
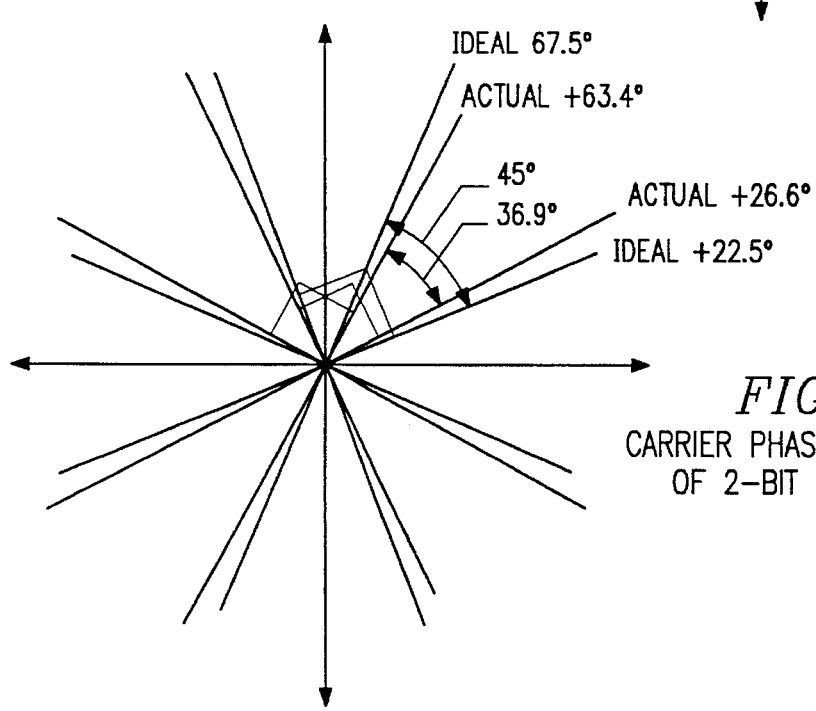
FIG. 21 shows the non-orthogonal axes for the carrier generator.

FIG. 21 shows an ideal spacing versus the actual spacing achieved with four output levels. As can be seen from the FIGURE, four states are on one set of orthogonal axes and the other four states are on another set of orthogonal axes. Each set of axes has a phase bias associated with it with respect to the ideal case. The phase bias associated with states $000_2$, $010_2$, $100_2$ and $110_2$ is 4.065 degrees and with states $001_2$, $011_2$, $101_2$ and $111_2$ is −4.065 degrees. Note, when carrier hard-limiting is enabled, the outputs are effectively evenly spaced alleviating the cause of this phase settability anomaly.

For most set-ups, the state machine will spend very close to half the time on each set of axes during an integration period, thus the biases cancel. However, some set-ups will cause the state machine to spend significantly more time on one set of orthogonal axes than on the other. Phase bias associated with a set-up is calculated using the following equation:

$$P_{bias} = P_e \times 8.130 - 4.065 \quad (26)$$

where $P_{bias}$ is the phase and $P_e$ is the percentage of time the state machine dwells on an even state ($000_2$, $010_2$, $100_2$ or $110_2$) during an integration period. This phase bias, unless compensated for, causes a phase settability anomaly.

Frequencies which cause phase settability anomalies are ones which cause the state machine to dwell a significantly different percentage of the time on one set of orthogonal axes than on the other. The carrier generator state machine only changes the set of axes it is on when the adder/accumulator carries. Therefore, frequency words which cause this type of phase settability anomaly are the ones which cause the adder/accumulator to carry an even number of times every odd number clocks. For example, if the adder/accumulator carries twice every five clocks, then two out of every five clocks (40 percent of the time) the state machine will be on one set of axes and three out of every five clocks (sixty percent of the time) the state machine will be on the other set of axes. This results in a phase bias of ±0.813 degrees, or a phase settability anomaly of 1.626 degrees. Only two frequency words cause this type of phase settability anomaly to be greater than 2 degrees. A frequency word of zero causes a phase settability anomaly of 4.07 degrees and a frequency word of $\frac{2}{5} \times 2^{32}$ causes a phase settability anomaly of 2.71 degrees.

Figure 22:
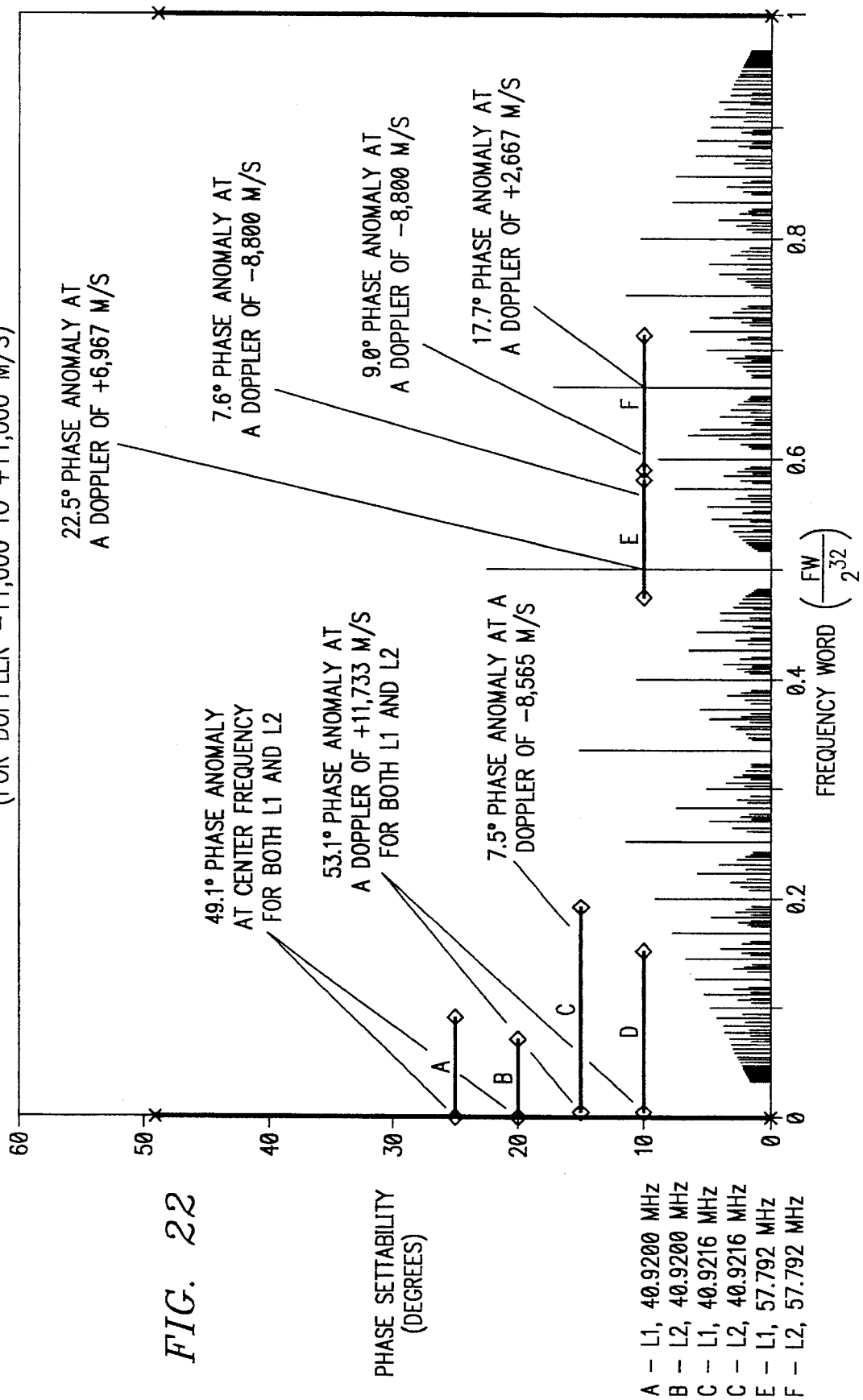
FIG. 22 shows the phase settability anomalies for the carrier generator.

FIG. 22 shows all phase anomalies greater than 2 degrees for the carrier generator as a function of the frequency word. Super-imposed on this graph, is the normal operating range for the carrier generator for each mode of operation.

This design approach can benefit any system where power conservation is important and where a high precision digital oscillator is required whose output must be synchronous to a high speed clock. The more bits of precision required and the higher the frequency of the reference clock, the greater the power savings over a conventional adder/accumulator digital oscillator approach.

Figure 29:
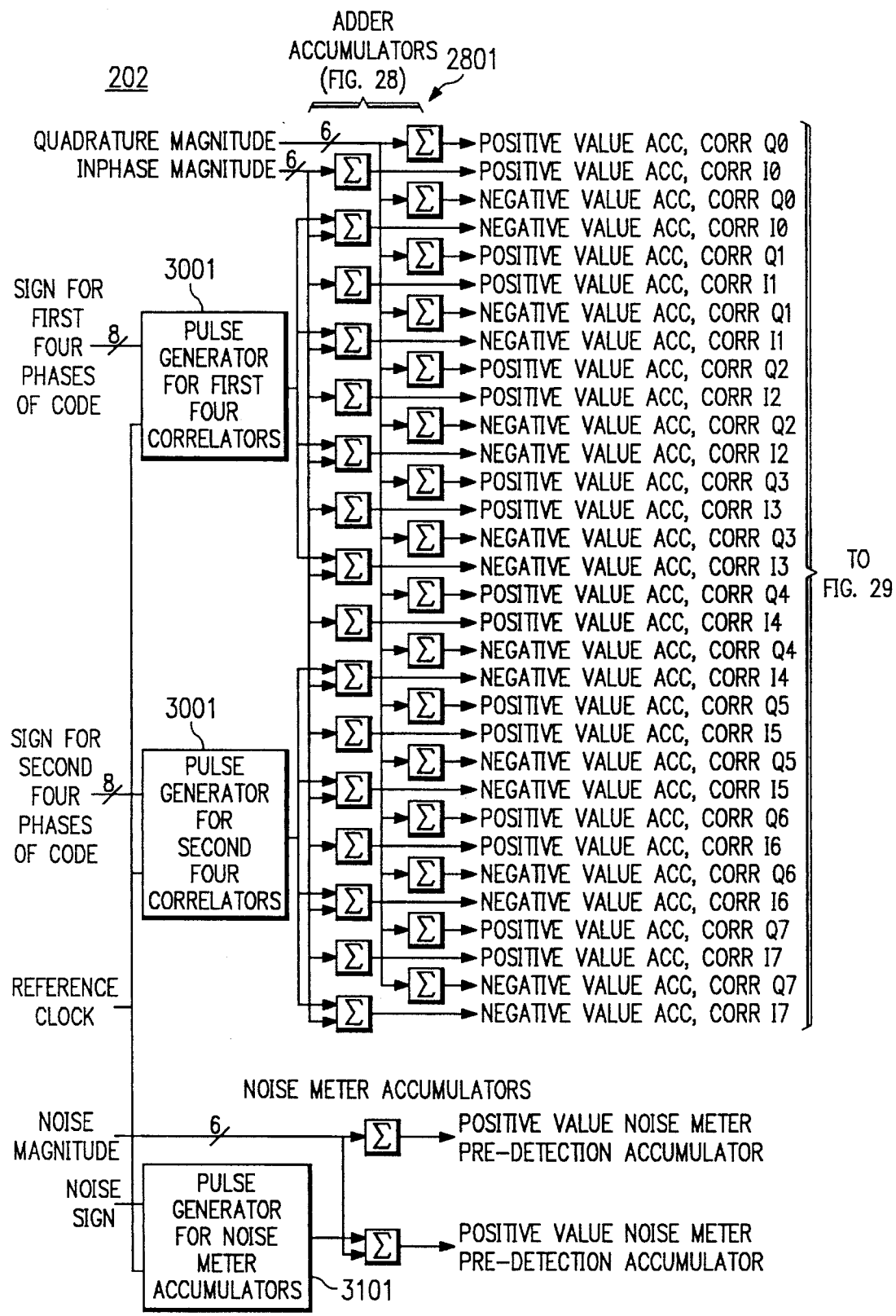
FIG. 29 shows a block diagram of the intermediate correlator module.

FIG. 29 shows a block diagram of the intermediate correlator module 202 (FIG. 2). Each of the eight complex correlators per channel in the PCOAC includes four six bit adder/accumulators, two for in phase accumulation and two for quadrature accumulation. The adder/accumulators function in pairs, one to accumulate positive values and one to accumulate negative values. In addition to the 32 adder/accumulators required per channel for the eight correlators, two adder/accumulators are required per channel to support the noise meter, making a total of 68 adder/accumulators on the chip running at up to 57.792 MHz. This makes power dissipation an issue. Using asynchronous design techniques one of these adder/accumulators takes less than 60 gates and dissipates less than 7 mW. A conventional ripple-adder with a 6-bit register, takes about 90 gates and dissipates about 25 mW.

Figure 23:
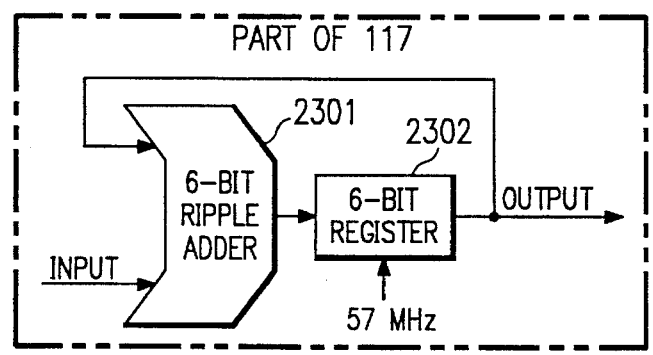
FIG. 23 shows prior art for a 6-bit adder/accumulator.
Figure 24:
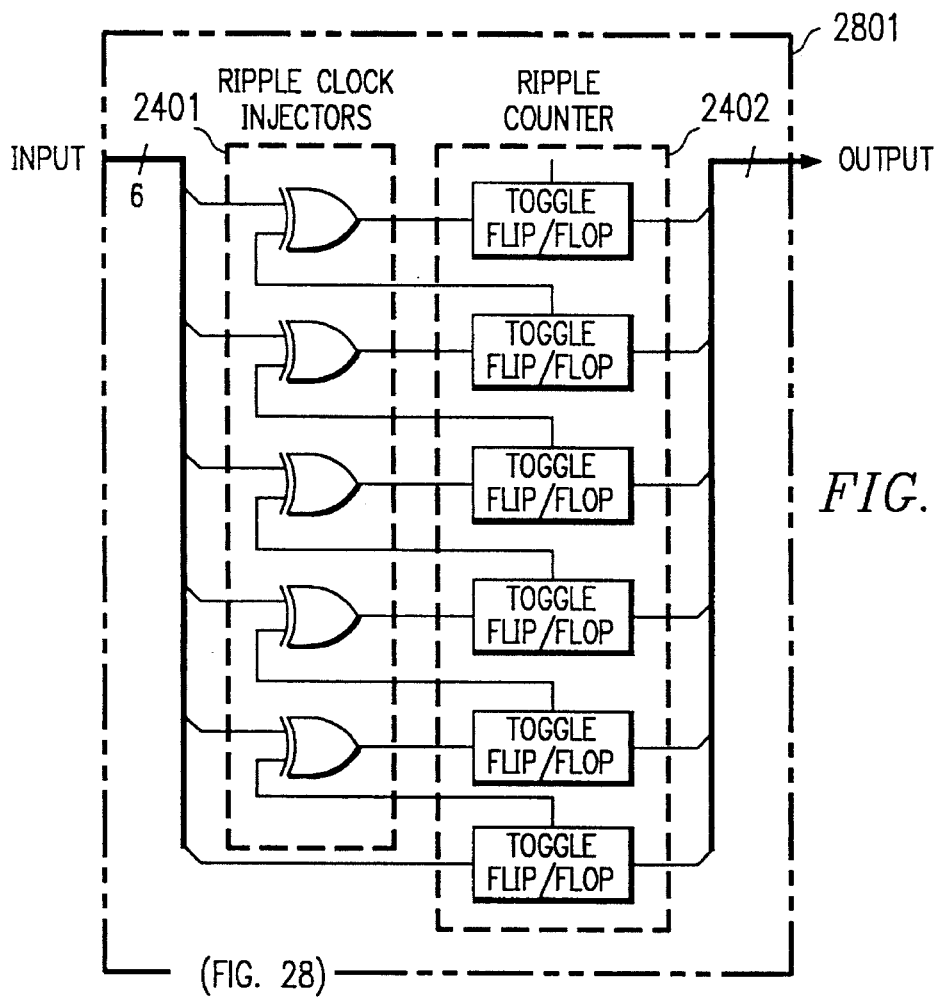
FIG. 24 shows a block diagram of the special adder/accumulator.

FIG. 23 shows the block diagram of a conventional adder/accumulator, while FIG. 24 shows the block diagram of the specially developed adder/accumulator. For 68 adder/accumulators, this is a difference of almost 2,000 gates and, for a system with six complete L1 and L2 channels, this is a difference of about 6.8 watts. Permutation is used elsewhere in the PCOAC and is discussed later. This adder/ accumulator is the most significant of many design innovations that make the PCOAC possible.

The implementation of intermediate correlator module 202 (FIG. 2) requires the development of three custom macro-cells, which are combined to form a hard-macro function called ICORR. These three custom macro-cells are:

the BIADD6, the aforementioned 6-bit adder/accumulator (binary multiple only), the PULGENA, a pulse generator to drive the two BIADD6s for noise measurements, and the PULGENB, a pulse generator to drive a group of sixteen BIADD6s associated with four correlators.

The BIADD6 is a 6-bit adder/accumulator designed for low power operation and low gate utilization. It is implemented using a ripple counter 2402 with a boolean exclusive OR between each stage 2401. (FIG. 24)

Figure 25:
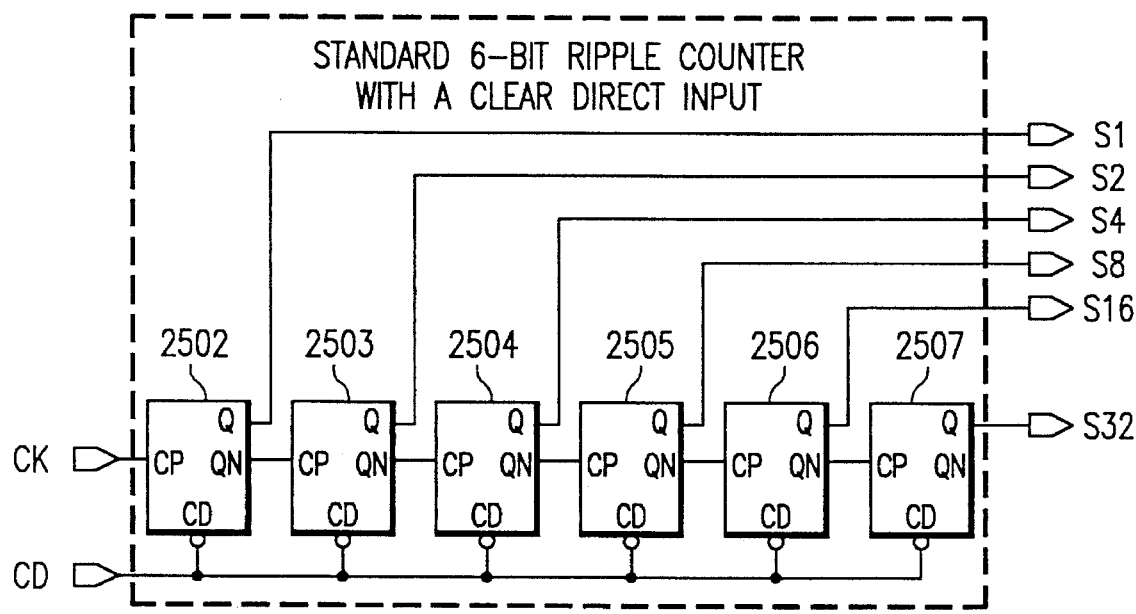
FIGS. 25–28 show how a special adder/accumulator is built.
Figure 26:
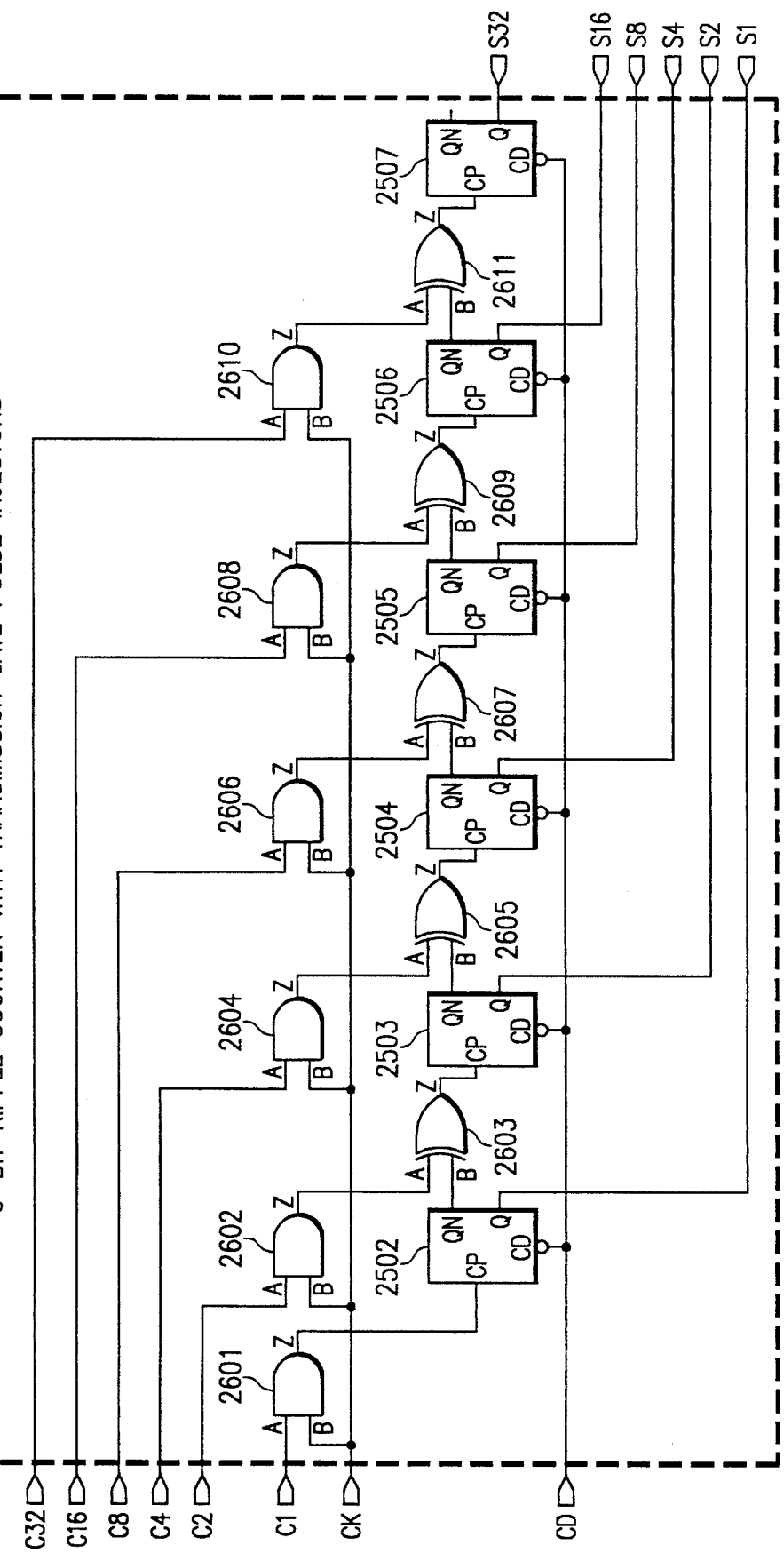

FIG. 25 shows a standard 6-bit ripple counter with a clear direct input. FIG. 26 shows this same ripple counter with a transmission gate exclusive OR 2603, 2605, 2607, 2609, 2611 between each stage 2502, 2503, 2504, 2505, 2506, 2507 and with the input data gated with a pulse input 2601, 2602, 2604, 2606, 2608, 2610.

Figure 27:
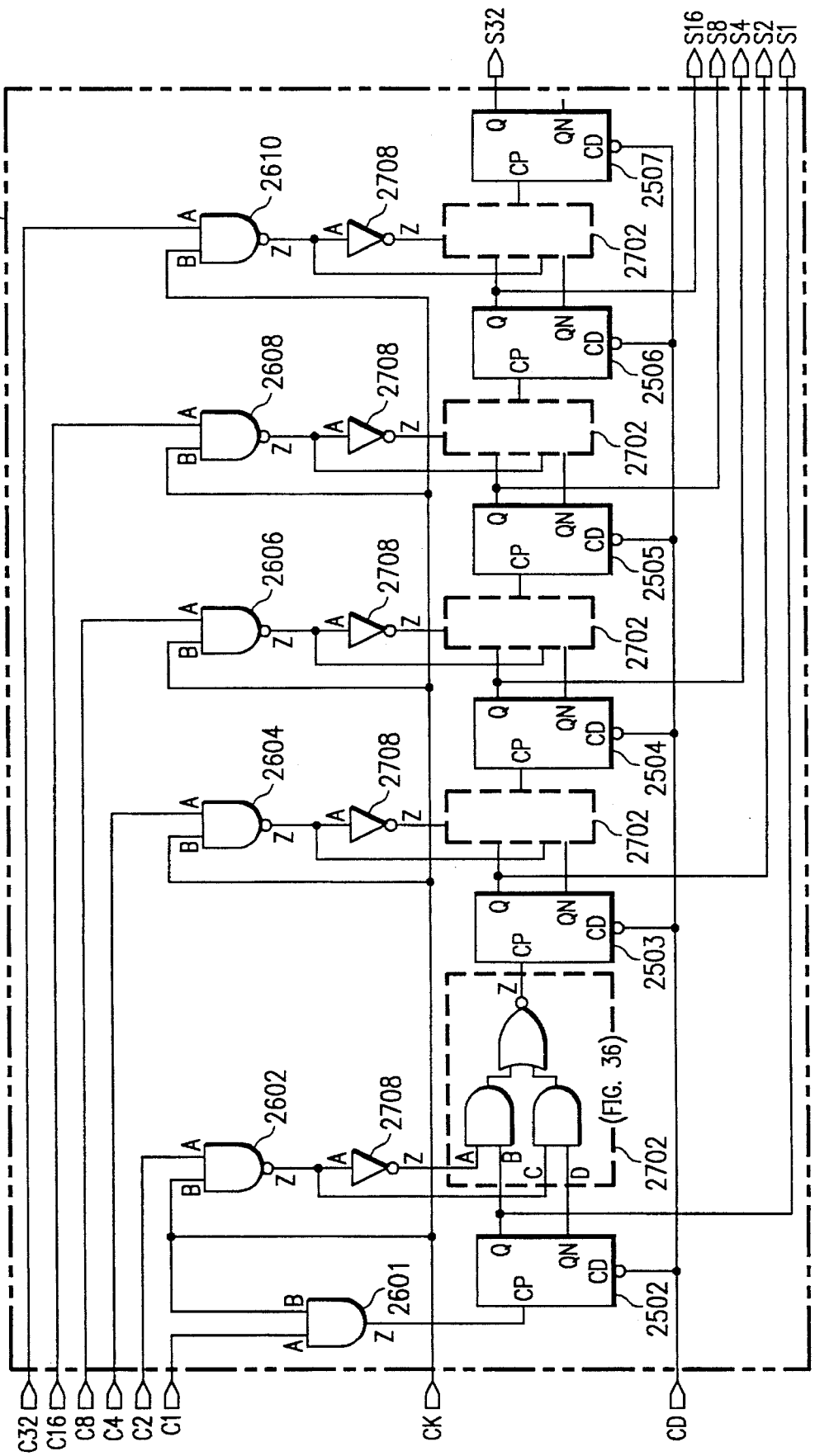

FIG. 27 shows the same function as FIG. 26 but with the transmission gate exclusive ORs replaced with boolean exclusive ORs, 2702 and 2708. These exclusive ORs are used to inject a pulse to any stage of the ripple counter. Boolean exclusive OR gates are required because transmission gate exclusive OR gates which are available produce a glitch which affects circuit operation. The content of the ripple counter is the accumulated value. When the clock input to one of the toggle flip/flops (which comprise the ripple counter) is pulsed, the value $2^n$ is added to the accumulated value where n (0 to 5) indicates which flip/flop input is pulsed.

Figure 28:
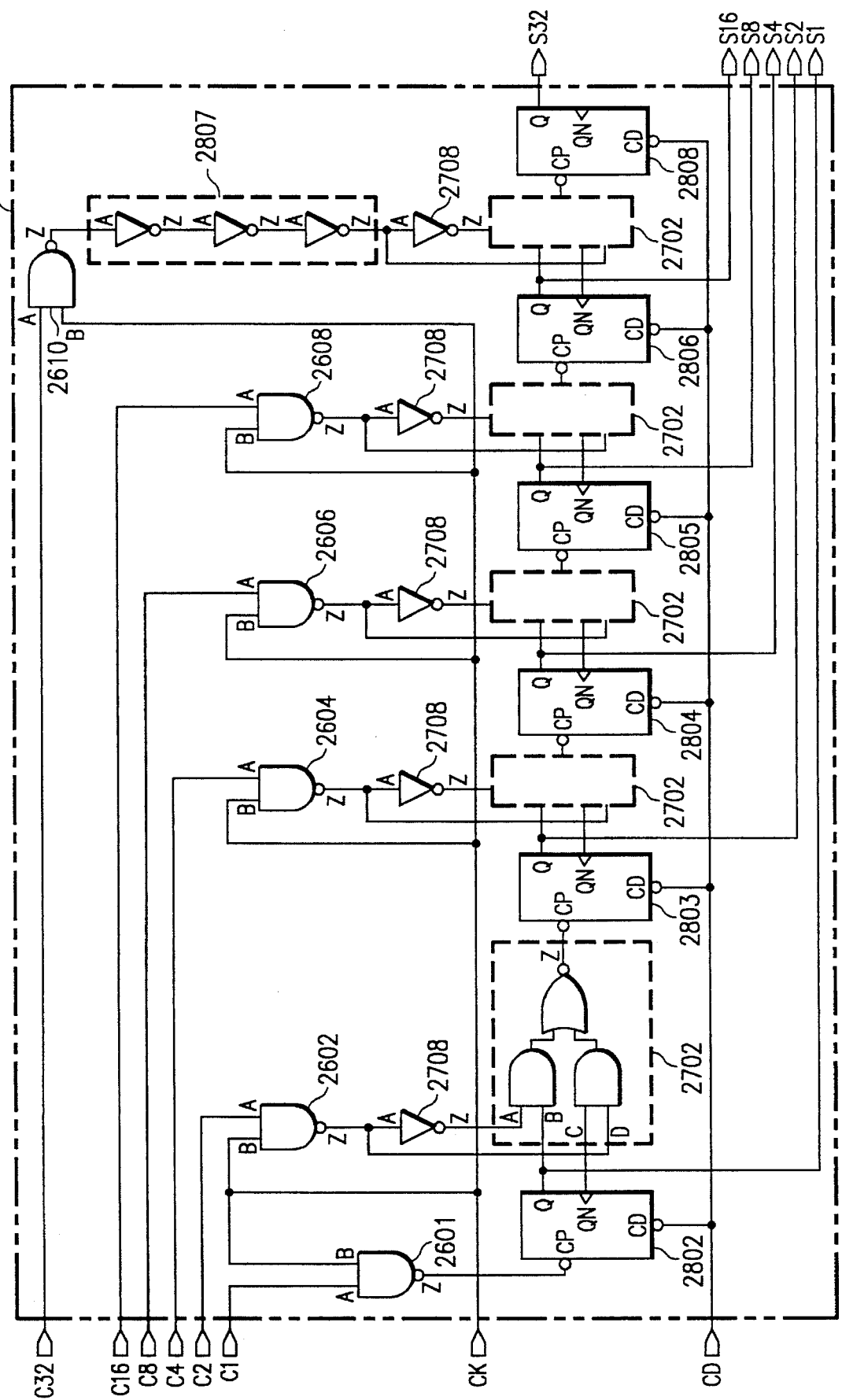

FIG. 28 shows the final implementation of the BIADD6 macro-cell. Ripples start from either edge of an injected pulse depending upon the state of the previous flip/flop. The worst case ripple through the BIADD6 is when the BIADD6 contains a $111110_2$ and a 2 is added followed by adding a 32. When this occurs, the second flip/flop is clocked on the falling edge of the first injected pulse and the sixth flip/flop is clocked on the rising edge of the second injected pulse. Therefore, the BIADD6 must ripple from the second flip/flop to the last flip/flop during the pulse low time (significantly less than one reference clock period). To provide more margin, negative edge clocking flip/flops are used to reduce propagation delay for a ripple and pulse injection to the last stage is delayed 2807 in order to give more time for a worst case ripple. A pulse generator is also used to provide a short positive going pulse, which also provides more time for the worst case ripple. There are two pulse generators, PULGENA and PULGENB.

PULGENA is a custom macro-cell designed to provide short high going pulses for the two BIADD6 cells allocated to the noise meter. FIG. 31 shows the PULGENA custom cell. The pulse generator works by ANDing 3106 and 3107 the reference clock with a delayed and inverted version of the reference clock 3103, 3104 and 3105 and with the sign bit for the next sample of noise data. PULGENA has two sign inputs, one active high and the other active low. It also has an off input which forces the delayed reference clock low, thus masking the pulse outputs. A great deal of SPICE simulation was required to verify the width of the pulse generated is never too narrow to be missed by the BIADD6 and is always narrow enough to guarantee the worst case ripple through the BIADD6.

Figure 30:
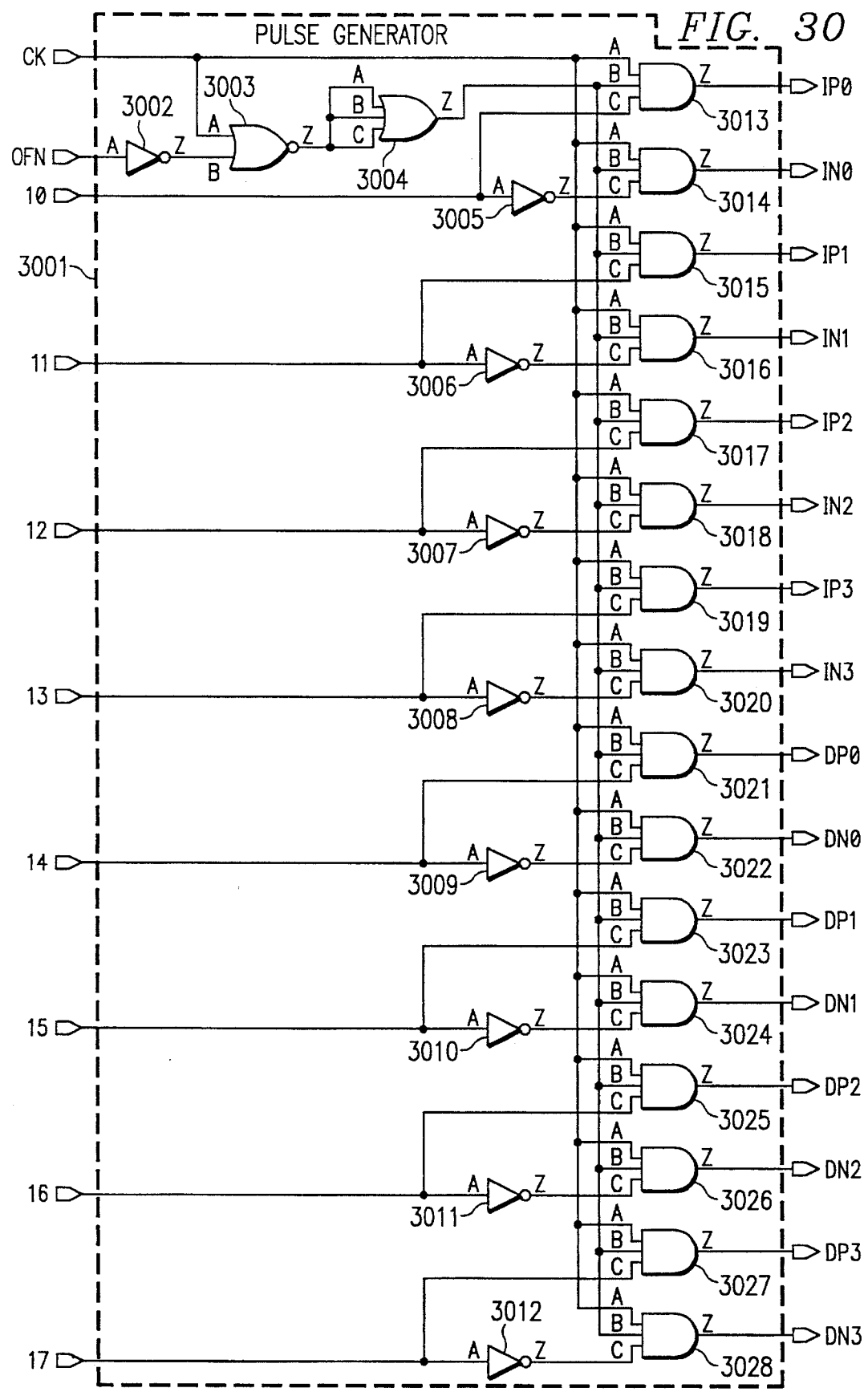

PULGENB is a custom macro-cell designed to provide short high going pulses for sixteen BIADD6 cells allocated to one set of four correlators. FIG. 30 shows the PULGENB custom cell. One pulse generator is used for all sixteen BIADD6s for power conservation. The PULGENB is designed using the same principle as the PULGENA.

The BIADD6 custom cell architecture requires that only certain inputs be used, primarily binary multiple only inputs.

FIG. 32 lists the valid inputs for the BIADD6 in all applications.

FIG. 33 shows an example of how two BIADD6 cells are used together to perform the high frequency integration.

FIG. 37 shows inputs which are always invalid and will cause the BIADD6 to operate in a way that is unpredictable.

Lastly, FIG. 35 shows inputs which may produce determinant results depending on the values that are already contained in the BIADD6 circuit. These input values yield determinant results when the following two criteria are met. Two adjacent bits of the adder/accumulator cannot be added to during the same reference clock period, and the bit adjacent to and less significant than a bit being added to cannot be carried into during the same reference clock period.

By modifying the BIADD6 cell slightly, it is possible to make an adder/accumulator which is not restricted to adding only binary-multiples. To do this, the boolean logic exclusive OR must have a balanced rise and fall time and the whole adder accumulator must have time to settle between clock edges (both the rising and falling edges are active).

Asynchronous pulses occur at the output of these boolean logic EXORs when the data input to the EXOR is pulsed and the previous flip-flop carries. A balanced rise and fall time of the EXOR ensures that this pulse will meet the minimum pulse width requirement for the flip-flop. FIG. 36 shows the transistor level model of the boolean EXOR used in a previously developed experimental ASIC. Two P transistors are used in parallel to balance the N transistors. The technology used for the PCOAC has balanced P and N transistors, therefore the boolean EXOR in the PCOAC has only four P transistors.

FIG. 37 shows the special adder/accumulator cell developed for the PCOAC. It uses a 2-to-1 multiplexer 3702 to give the adder/accumulator two ports. Using an N-to-1 multiplexer in a similar manner would expand the operation of the adder/accumulator cell to N ports.

Figure 38:
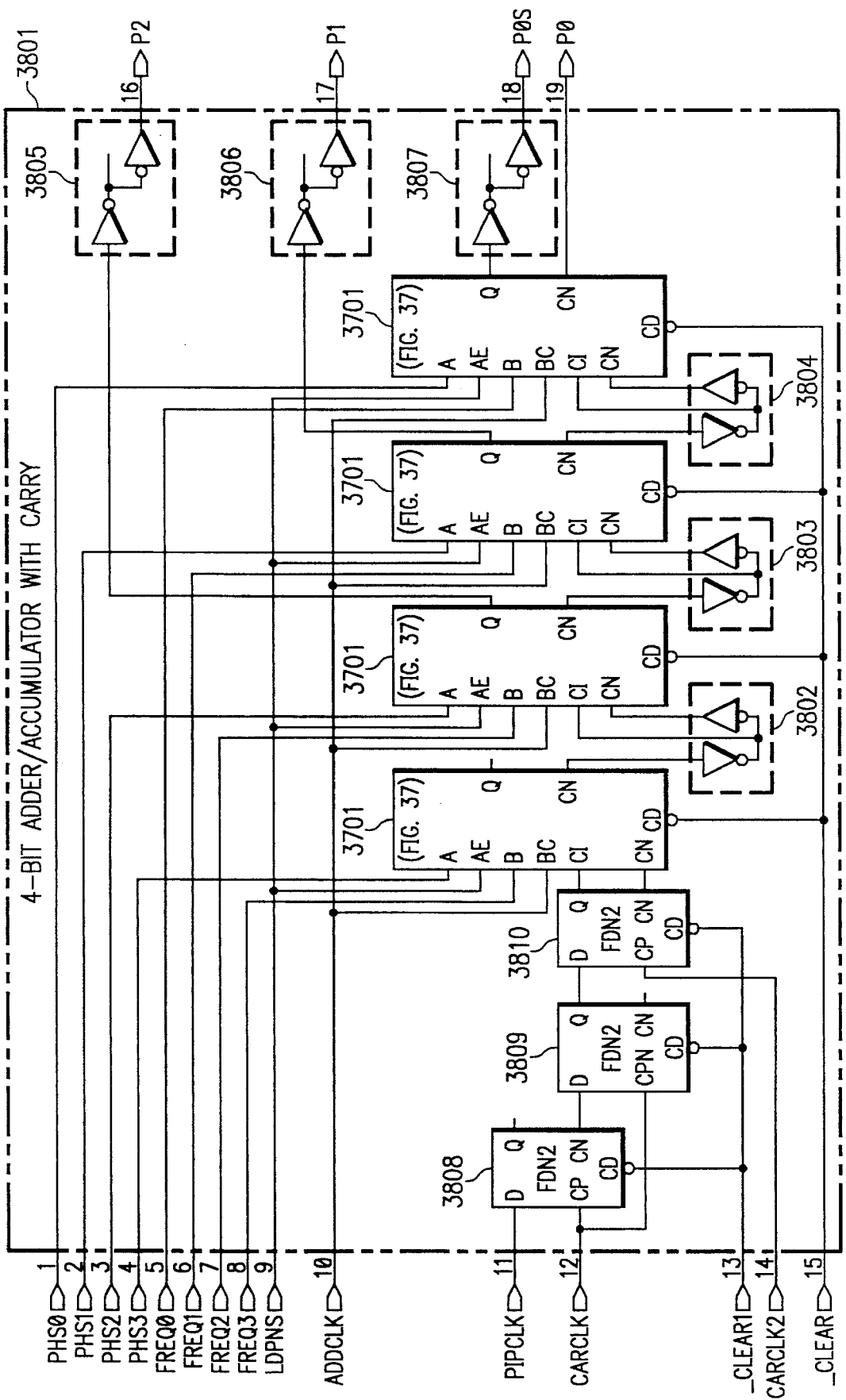
FIG. 38 shows a 4-bit adder/accumulator with carry.

FIG. 38 shows how these cells are connected together to create a 4-bit adder/accumulator. To add margin for reliability, delay 3802, 3803, and 3804 are added between stages 3701. The flip-flops 3808, 3809, 3810 are used to pipeline the carry between adder/accumulator stages.

Figure 39A:
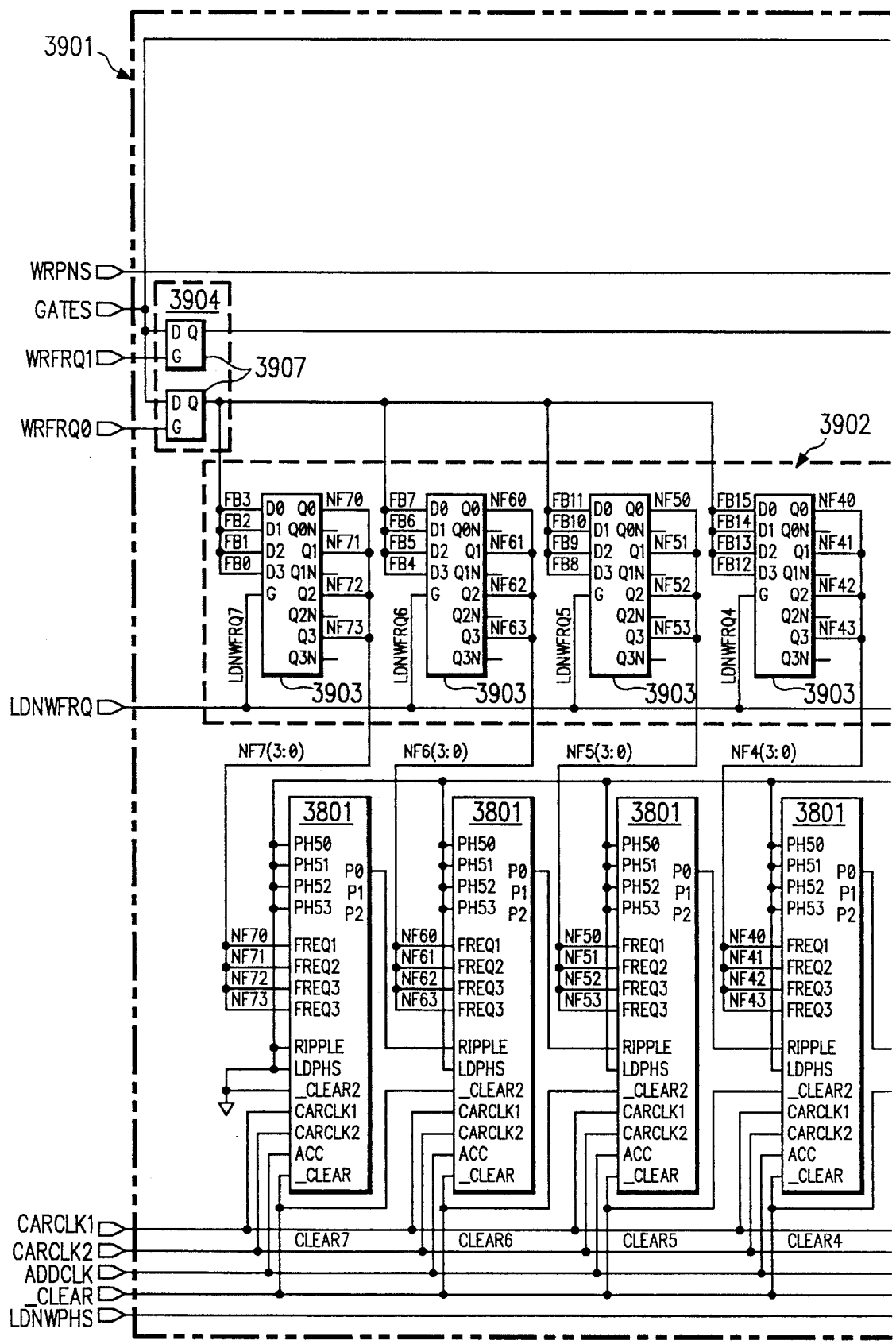
FIGS. 39a and 39b show the adder/accumulator with latches.
Figure 39B:
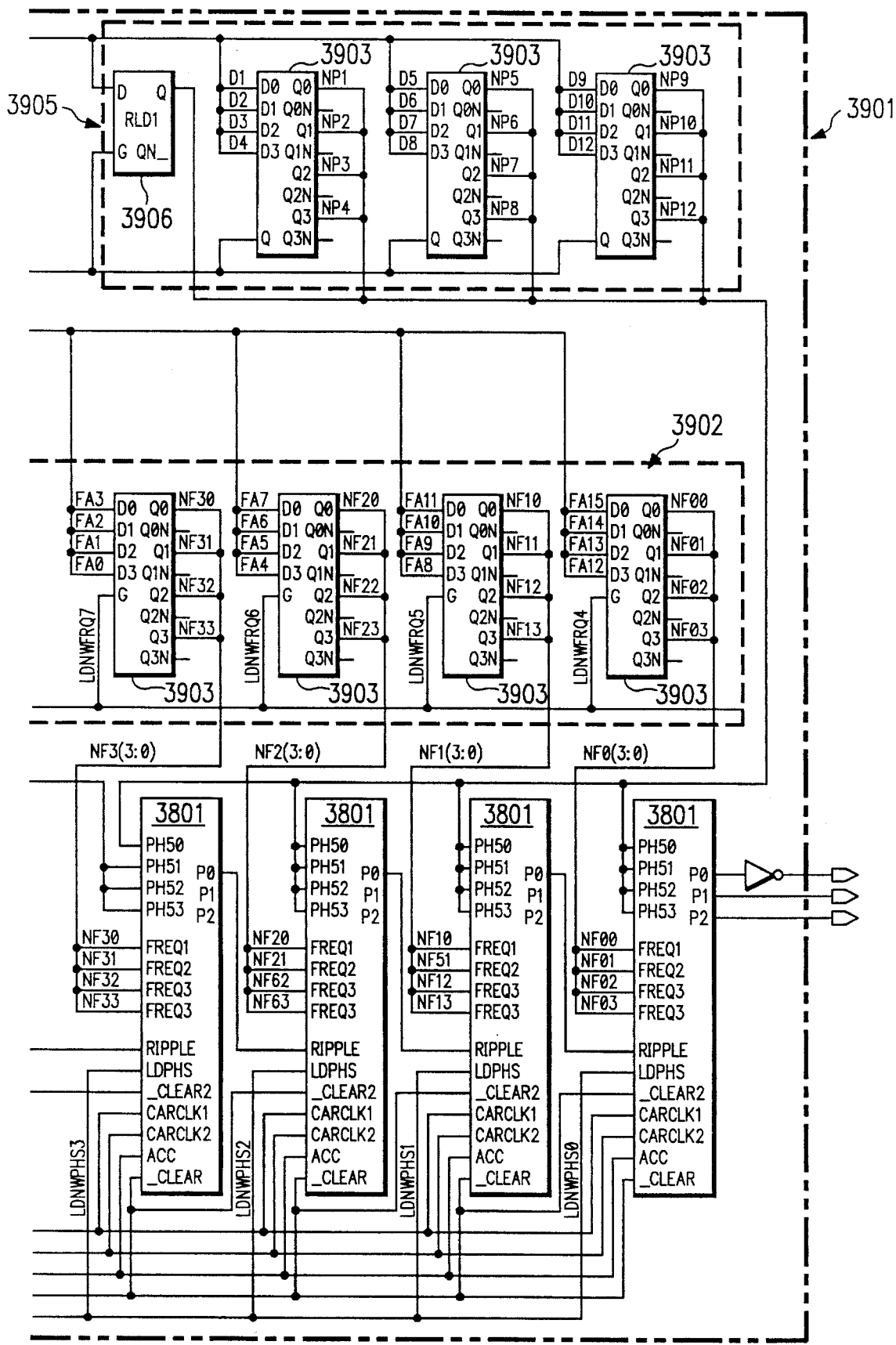

FIG. 39 shows a 32-bit adder/accumulator built by pipelining 4-bit adder/accumulators together. Referring back to FIG. 38, after each complete addition, the most significant bit 11 of a 4-bit adder/accumulator is clocked into register 3808. The clock 12 used for this operation is called the carry clock. The bit is then clocked into another register using the opposite edge of the carry clock. A delayed version of the carry clock 13 clocks this bit a third time to propagate it to the carry input of the least significant bit of the next stage just after the addition at that stage has been started. It is necessary to use a delayed version of the carry clock to ensure that the carry is not injected too soon thus violating the minimum pulse width requirement of the least significant toggle flip-flop.

This 32-bit adder/accumulator 3901 is used four times in the PCOAC, once in each code clock generator (FIG. 4) and once in each carrier generator. In addition, a non-pipelined adder/accumulator uses the special adder/accumulator cell 3701 (FIG. 37) for implementing part of the search processor circuitry 206 (FIG. 2). This adder/accumulator configuration saves gates over a conventional adder/accumulator.

We are now going to discuss circuitry contained within the back end correlator module 203 of FIG. 2. In order to perform predetection integration in the back end correlator module, it is prior art to use synchronous up/down counters. In a previous development, it was found that ripple counters could be used which would either count up 1 or not count at all. Two ripple counters would be used for each correlator, one for in-phase integration, and one for quadrature integration. A separate counter common to all correlators in a channel, was kept to keep track of how many reference clocks were generated during an integration period. At the end of an integration, the number of reference clocks or accumulated bias is subtracted from the final value accumulated for each in-phase and quadrature integrator.

This circuit had to be modified for two reasons. The first reason is that the circuit supports full null zone which means that the value in the chip of the demodulated signal is no longer just +1 or −1, but has multiple possible input valves. Secondly, in order to support search, we perform adjacent correlator presumming, and this removes the signal to noise ratio holes between correlators.

Figure 40:
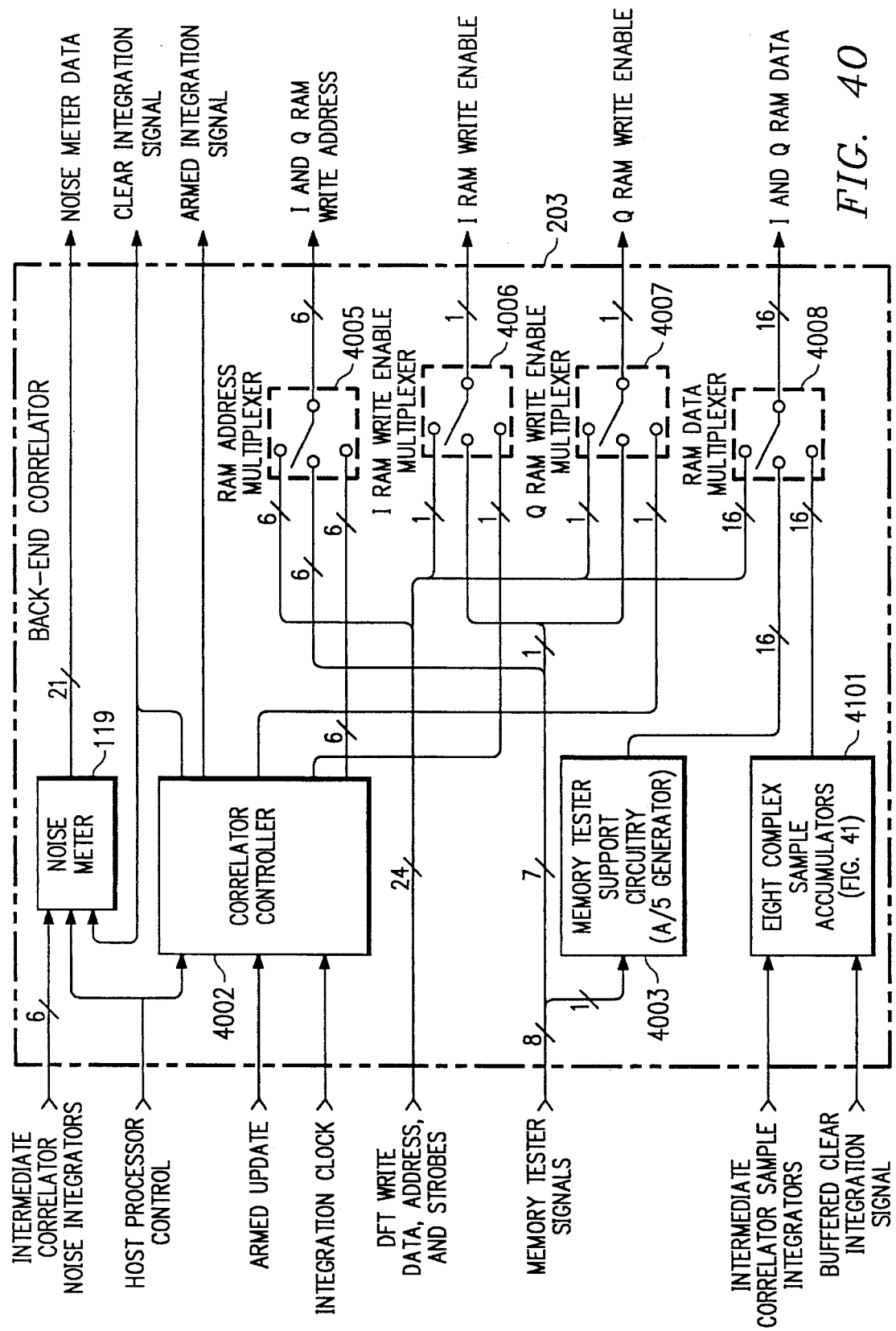
FIG. 40 shows a block diagram of the back-end correlator module.
Figure 41:
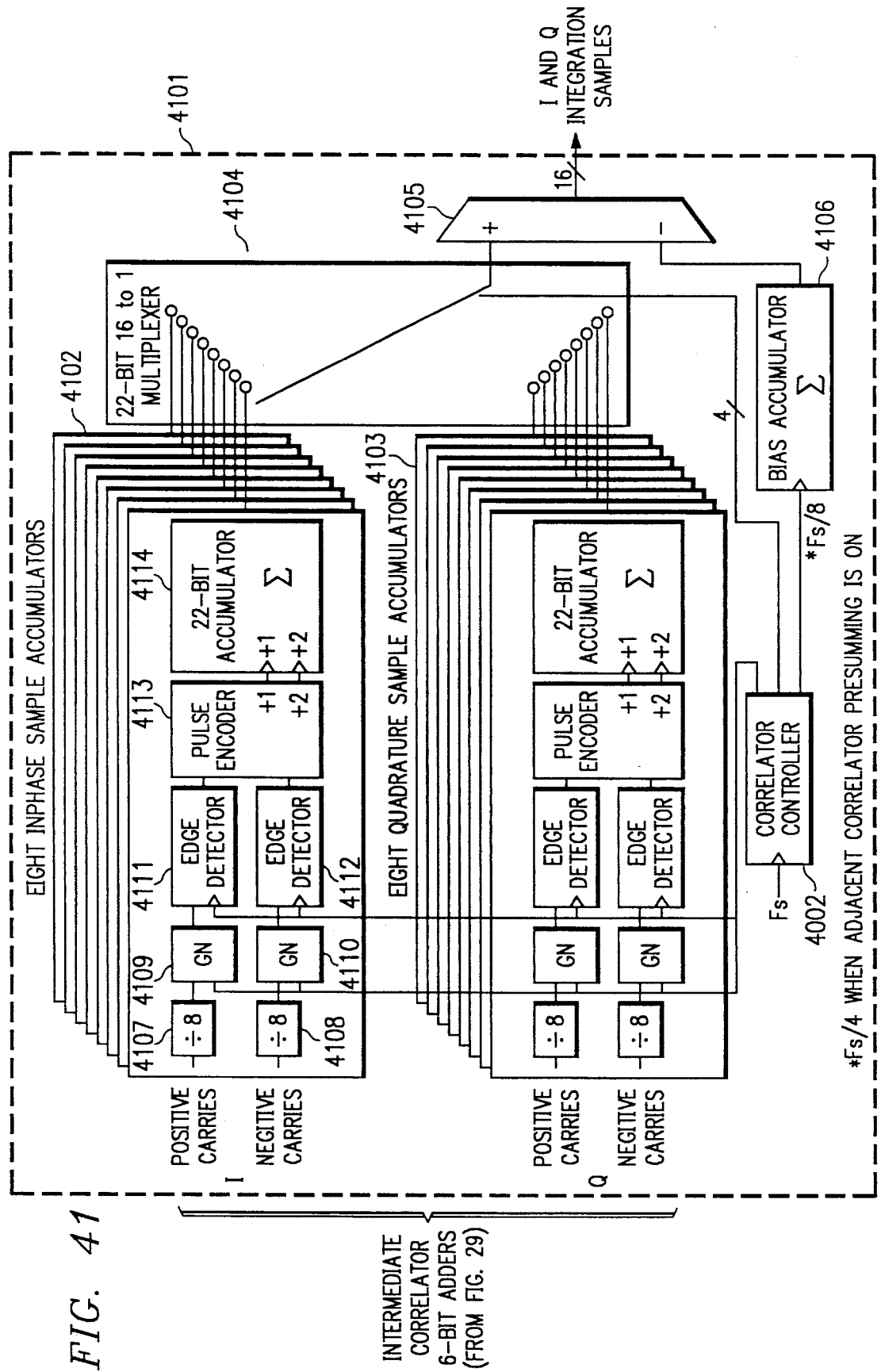
FIG. 41 shows how the eight complex adder/accumulators are built.

FIG. 40 shows a block diagram of the back end correlator module 203 from FIG. 2. The problems previously mentioned are solved in the sample accumulators 4101 of FIG. 41. The carries from the intermediate correlator module enter the sample accumulators and are immediately divided down by 8, 4107 and 4108, and are then reclocked 4109, 4110 and edge detection is performed, 4111 and 4112. Re-clocking occurs prior to edge detection in order to reduce the chance that a meta-stable state might effect a final accumulation value. From the output of the edge detector pulses are encoded 4113.

Figure 43:
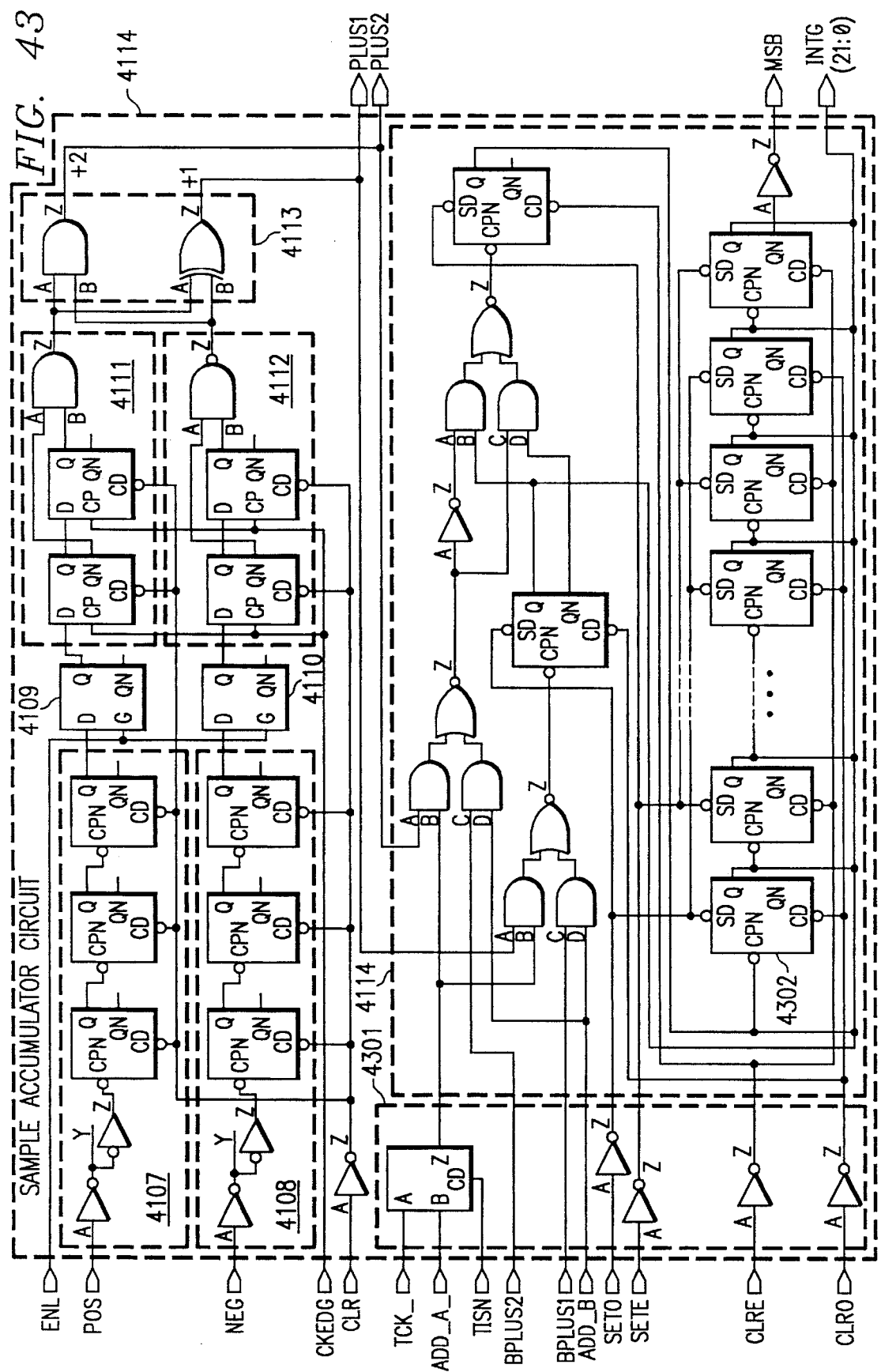
FIG. 43 shows a detailed circuit of the sample accumulators.

FIG. 42 shows the translation from carries from the intermediate correlator to which pulses are encoded. The pulses are encoded in such a way that a bias of 1 is added on every clock. The output of the pulse encoder will either be nothing, a pulse with a value of 1, or a pulse with the value of 2. These pulses go into a 22-bit ripple counter 4114, whose first stage uses the adder/accumulator technique previously mentioned so that a 1 or a 2 can be added. A separate bias accumulator 4106 is kept which keeps track of reference clocks or how many times the +1 value is added. At the end of each integration a 22 bit 16:1 multiplexer 4104 selects each accumulated value and subtracts the bias off using the adder 4105. These values are stored in the I&Q RAM 204 and 205 of FIG. 2. FIG. 43 shows the detailed circuitry required to build a sample accumulator as previously described. For search applications, the search processor previously described and also described in the above-mentioned copending patent application entitled "System and Method for a Digital Navigation Satellite Receiver" uses all correlators to search for the signal.

Figure 45:
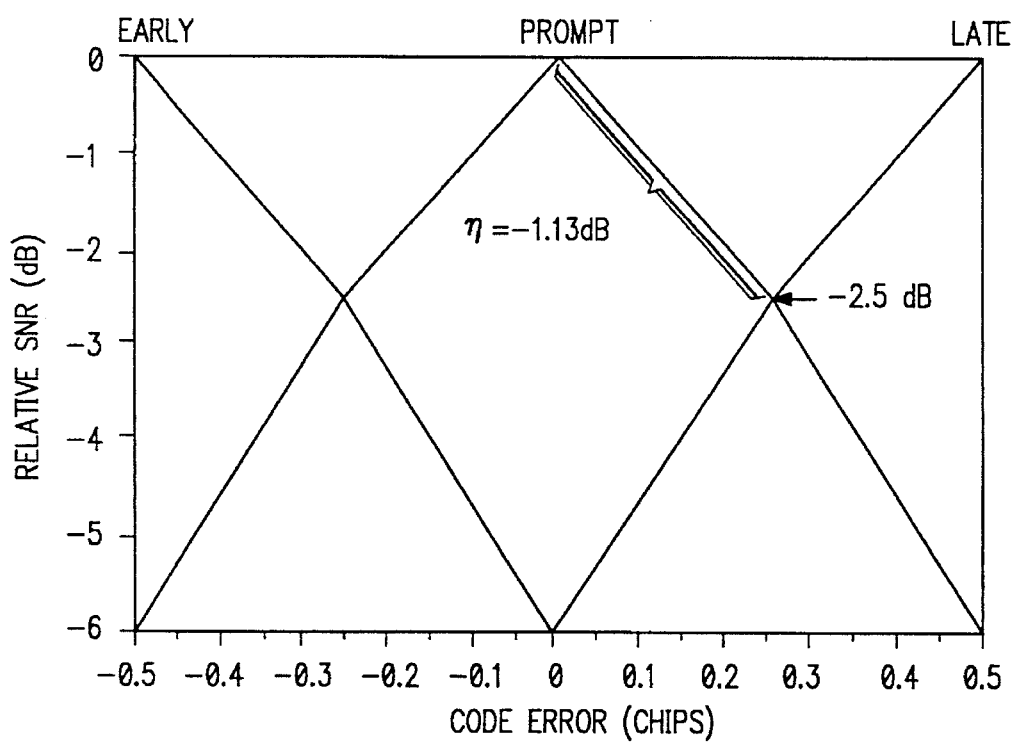
FIG. 45 shows performance without adjacent correlator presumming.

FIG. 45 shows the relative signal to noise ratio as a function of code error or how far the incoming signal is away from the signal generated in the chip at a particular correlator. As can be seen in this FIGURE, there is a 2.5 dB signal to noise ratio hole between each of the correlators which are spaced 0.5 chips apart. To eliminate this hole, adjacent correlator values are summed together FIG. 44. This process is called adjacent correlator presumming. It is called presumming because it is done during predetection integration. The adder/accumulators support this, as shown in FIG. 43.

Figure 46:
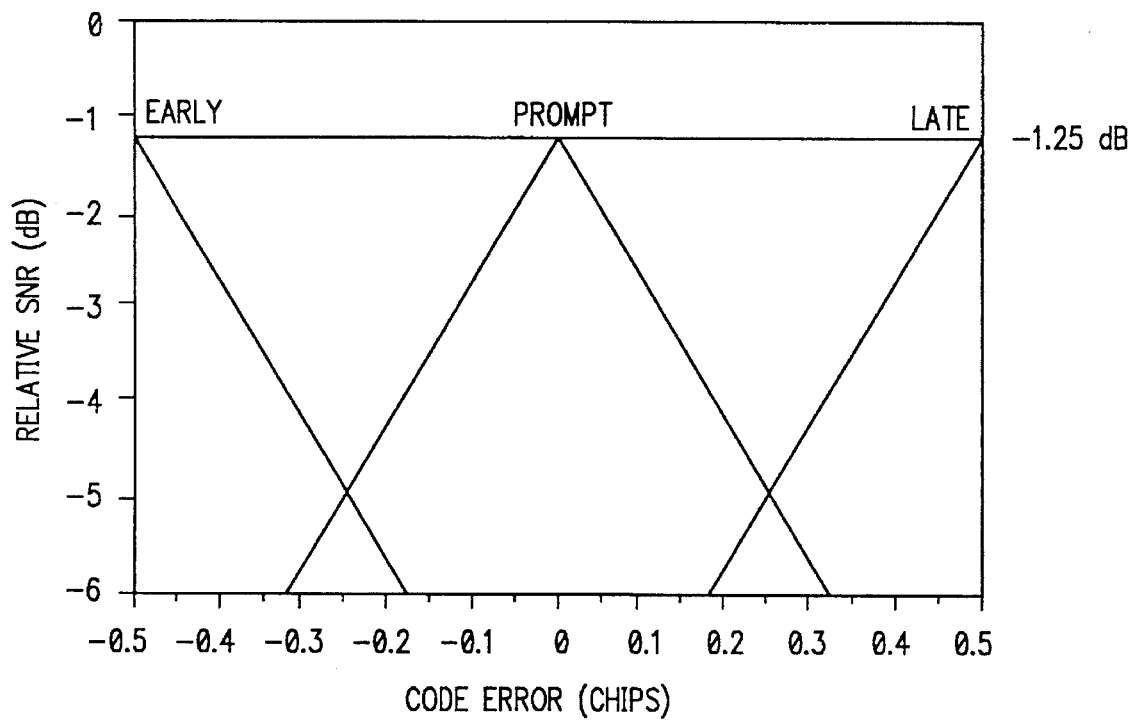
FIG. 46 shows performance with adjacent correlator presumming.

FIG. 46 shows the results of adjacent correlator presumming. As can be seen, there is a flat 1.25 dB loss, but there are no signal to noise ratio holes. Our sample accumulator/circuit accomplishes this, as shown in FIG. 43, by taking the pulses encoded from the adjacent correlator and applying those values to the 22 bit accumulator 4114. In doing this, the correlator controller must clock the bias accumulator 4106 of FIG. 41 at twice its normal rate, as noted at the bottom of FIG. 41.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. A digital signal processing (DSP) circuit for use in a global positioning system (GPS) receiver, said DSP circuit comprising, on a single integrated circuit (IC):

Y-code generator circuitry; and at least one signal processing channel, said channel including circuitry means for processing at least one of a valid P-code signal and Y-code signal from at least one satellite of said GPS.

2. The circuit set forth in claim 1 wherein said DSP includes circuitry for processing C/A code.

3. The circuit set forth in claim 2 wherein said DSP includes:

circuitry for tracking C/A and P-code simultaneously.

4. The circuit set forth in claim 1 wherein said DSP includes circuitry for processing P-code or Y-code selectively.

5. The circuit set forth in claim 4 wherein said DSP includes circuitry for processing multiple channels.

6. The circuitry set forth in claim 5 wherein said Y-code on any said channel is generated by a single Y-code generator common to all said multiple channels.

7. The circuitry set forth in claim 1 wherein said DSP includes circuitry for processing multiple channels.

8. The circuitry set forth in claim 7 wherein said DSP includes:

a noise meter per channel for aiding in said acquiring or tracking of signal.

9. The circuitry set forth in claim 7 wherein said DSP includes circuitry for allowing one channel to generate a test signal for use by other channels.

10. The circuitry set forth in claim 1 further comprising:

circuitry for selectively processing L1 or L2 signals.

11. The circuitry set forth in claim 1 wherein said DSP includes:

circuitry for establishing programmable integration periods for signal correlation.

12. The circuitry set forth in claim 1 wherein said DSP includes a noise meter for aiding in said acquiring or tracking of signal.

13. The circuitry set forth in claim 1 wherein said DSP includes circuitry for supporting full null zone signal inputs.

14. The circuitry set forth in claim 1 wherein said DSP includes a search processor for fast signal acquisition.

15. The circuitry set forth in claim 14 wherein said search processor includes a fourier transform function.

16. The circuitry set forth in claim 15 wherein said search processor further includes circuitry to interpolate new frequency bins between the frequency bins of said fourier transform function.

17. The circuitry set forth in claim 14 wherein said search processor includes a Tong detection algorithm.

18. The circuitry set forth in claim 17 wherein said search processor further includes frequency bin mask bits which exclude certain frequency bins of said fourier transform from being considered in said Tong detection algorithm.

19. The circuitry set forth in claim 17 wherein said search processor further includes correlator mask bits which exclude certain code states from being considered in said Tong detection algorithm.

20. The circuitry set forth in claim 14 wherein said search processor includes:

a mush counter for controlling the time that said digital signal processing circuitry attempts to acquire any particular signal.

21. The circuitry set forth in claim 14 wherein said search processor includes:

a mush counter for providing an indication of either a bad signal or a bad search threshold.

22. The circuitry set forth in claim 14 wherein said search processor further includes a hit counter for aiding in the determination of the adequacy of a search threshold.

23. The circuitry set forth in claim 14 wherein said search processor further includes a threshold calculator which autonomously adjusts for noise level.

24. The circuitry set forth in claim 23 wherein said threshold calculator further includes the calculation of a second threshold for the interpolated frequency bins which is the square root of 2 greater than the regular threshold.

25. The circuitry set forth in claim 14 wherein said search processor utilizes a Robertson approximation to generate correlation envelopes.

26. The circuitry set forth in claim 1 wherein said DSP further includes a digital oscillator for providing carrier or code clock synchronous to a high frequency reference clock which mostly runs at a significantly lower frequency for reduced power dissipation.

27. The circuitry set forth in claim 26 wherein said digital oscillator for carrier generation includes circuitry for selective one or two bit carrier generation.

28. The circuitry set forth in claim 1 wherein said DSP further includes:

an adder/accumulator primarily for accumulating only binary multiples, said adder/accumulator including:

pulse injectors operating in conjunction with a ripple counter for reduced power dissipation and gate count.

29. The circuitry set forth in claim 1 wherein said DSP further includes:

a correlator configuration including ripple counters for predetection integration bias accumulation; and an adder for subtraction of said bias.

30. The circuitry set forth in claim 29 wherein said correlator configuration supports adjacent correlator pre-summing.

31. The circuitry set forth in claim 29 wherein said correlator configuration supports full null zone operation.

32. A device for use in GPS receivers for processing of multiple digitized satellite signals, said device comprising, on a single application specific integrated circuit (ASIC):

Y-code generator circuitry;

multiple P(Y) and C/A-code channel means for processing said multiple digitized satellite signals; and a search processor for fast signal acquisition.

33. The device set forth in claim 32 further including:

circuitry for tracking said C/A and P(Y)-code simultaneously.

34. The device set forth in claim 32 further including:

circuitry for processing P-code or Y-code selectively.

35. The device set forth in claim 32 wherein said Y-code is generated by a single Y-code generator common to all said multiple channels.

36. The device set forth in claim 32 further including:

circuitry for selectively processing L1 or L2 signals.

37. The device set forth in claim 32 further including:

circuitry for establishing programmable integration periods for signal correlation.

38. The device set forth in claim 32 further including:

a noise meter for aiding in acquiring or tracking said signals.

39. The device set forth in claim 32 further including:

circuitry for supporting full null zone signal inputs.

40. The device set forth in claim 32 wherein said search processor includes a fourier transform function implementation circuit.

41. The device set forth in claim 40 wherein said search processor further includes:

circuitry to interpolate new frequency bins between the frequency bins of said fourier transform.

42. The device set forth in claim 32 wherein said search processor includes a Tong detection algorithm implementation circuit.

43. The device set forth in claim 42 wherein said search processor further includes:

first circuitry means for providing frequency bin mask bits which exclude certain frequency bins from being considered in said Tong detection algorithm implementation circuit.

44. The device set forth in claim 42 wherein said search processor further includes:

second circuitry means for providing correlator mask bits which exclude certain code states from being considered in said Tong detection algorithm implementation circuit.

45. The device set forth in claim 32 wherein said search processor includes:

a mush counter for controlling the time that said processor attempts to acquire any particular signal.

46. The device set forth in claim 32 wherein said search processor includes:

a mush counter for providing an indication of either a bad signal or a bad search threshold.

47. The device set forth in claim 32 wherein said search processor further includes:

a hit counter means for aiding in the determination of the adequacy of a search threshold.

48. The device set forth in claim 32 wherein said search processor further includes:

a threshold calculator which autonomously adjusts for noise level.

49. The device set forth in claim 48 wherein said threshold calculator further includes:

circuitry for calculating a second threshold for the interpolated frequency bins.

50. The device set forth in claim 32 wherein said search processor further includes:

circuitry for utilizing the Robertson approximation to generate correlation envelopes.

51. The device set forth in claim 32 further including:

a digital oscillator for providing carrier or code clock synchronous to a high frequency reference clock which mostly runs at a significantly lower frequency for reduced power dissipation.

52. The device set forth in claim 51 wherein said digital oscillator for carrier generation includes circuitry for selective one or two bit carrier generation.

53. The device set forth in claim 32 further including:

an adder/accumulator primarily for accumulating only binary multiples, said adder/accumulator including:

pulse injectors operating in conjunction with a ripple counter for reducing power and gate count.

54. The device set forth in claim 32 further including:

a correlator configuration using ripple counters for predetection integration and bias accumulation; and an adder for subtraction of said bias.

55. The device set forth in claim 54 wherein said correlator configuration supports adjacent correlator presumming.

56. The device set forth in claim 54 wherein said correlator configuration supports full null zone operation.

57. The device set forth in claim 32 further including:

third circuitry means for causing one channel to generate a test signal for use by other channels.

58. The device set forth in claim 32 further including:

circuitry for establishing variable integration periods for signal predetection integration.

59. A device for tracking and acquiring global positioning system (GPS) signals from multiple satellites, said device comprising, on a single integrated circuit:

Y-code generator circuitry;

two P(Y) and C/A-code channels;

a search processor for fast signal acquisition;

support circuitry means for processing null zone signals;

said channels each comprising:

a carrier generator;

a code clock generator;

a P-code generator;

a C/A-code generator;

eight predetection integration accumulators; and a noise meter;

said search processor comprising:

a discrete fourier transform circuit;

first circuitry means for performing frequency bin interpolation;

second circuitry means for implementing a Robertson approximation for envelope calculation;

third circuitry means for implementing a Tong detection algorithm to determine if signal is present;

a threshold calculator which uses measurements from said noise meter;

fourth circuitry means for calculating a second search threshold for the interpolated frequency bins;

fifth circuitry means for advancing or retarding code state as required during search;

a mush counter which counts Tong detection iterations for a specific code state and either forces a new code state or stops search; and a hit counter which counts hits associated with a specified number of discrete fourier transform cycles and reports the most current value.

60. The device set forth in claim 59 wherein said predetection accumulators include:

circuitry for performing adjacent correlator presumming for removal of signal to noise ratio holes between code states;

a circuit configuration using ripple counters so as to minimize power consumption and gate count; and a circuit configuration using ripple counters and pulse injectors to minimize power consumption of high frequency sample accumulation.

61. The device set forth in claim 59 wherein said carrier and code clock generators include:

a digital oscillator circuit architecture which generates a carrier or code clock output synchronous to a high frequency clock but mostly runs at a low frequency to minimize power consumption; and a low frequency adder/accumulator using ripple counters and pulse injectors which reduce gate count.

62. The device set forth in claim 59 further including:

a circuit for converting P-code to Y-code which supports both channels simultaneously.

63. The device set forth in claim 59 further including:

circuitry for tracking C/A and P-code simultaneously.

64. The device set forth in claim 59 further including:

circuitry for establishing programmable integration periods for signal correlation.

65. The device set forth in claim 59 wherein said search processor further includes:

sixth circuitry means for providing frequency bin mask bits which exclude certain frequency bins from being considered in said Tong detection algorithm.

66. The device set forth in claim 59 wherein said search processor further includes:

seventh circuitry means for providing correlator mask bits which exclude certain code states from being considered in said Tong detection algorithm.

67. The device set forth in claim 59 further including:

correlator configuration circuitry using ripple counters for predetection integration and bias accumulation; and an adder for subtraction of said bias.

68. The device set forth in claim 67 wherein said correlator configuration circuitry provides adjacent correlator presumming.

69. The device set forth in claim 68, wherein said correlator configuration circuitry provides full null zone operation.

70. The device set forth in claim 59 further including:

eighth circuitry means for causing one channel to generate a test signal for use by other channels.

71. A device for use in GPS receivers for processing of multiple digitized satellite signals, said device comprising, on a single integrated circuit:

multiple P(Y) and C/A-code channel means for processing said multiple digitized satellite signals; and a search processor for fast signal acquisition, including means for simultaneously searching a plurality of frequency bins in each of said multiple channel means.

72. The device set forth in claim 71 further including:

circuitry for selectively processing L1 or L2 signals.

73. A device for tracking and acquiring global positioning system (GPS) signals from multiple satellites, said device comprising, on a single integrated circuit:

two P(Y) and C/A-code channels;

a search processor for fast signal acquisition;

support circuitry means for processing null zone signals;

said channels each comprising:

a carrier generator;

a code clock generator;

a P-code generator;

a C/A-code generator;

eight predetection integration accumulators; and a noise meter;

said search processor comprising:

a discrete fourier transform circuit;

first circuitry means for performing frequency bin interpolation;

second circuitry means for implementing a Robertson approximation for envelope calculation;

third circuitry means for implementing a Tong detection algorithm to determine if signal is present;

a threshold calculator which uses measurements from said noise meter;

fourth circuitry means for calculating a second search threshold for the interpolated frequency bins;

fifth circuitry means for advancing or retarding code state as required during search;

a mush counter which counts Tong detection iterations for a specific code state and either forces a new code state or stops search; and a hit counter which counts hits associated with a specified number of discrete fourier transform cycles and reports the most current value.

* * * * *